United States Patent
Lee et al.

(10) Patent No.: US 12,519,523 B2
(45) Date of Patent: Jan. 6, 2026

(54) CSI CODEBOOK FOR MULTI-TRP

(71) Applicant: Samsung Electronics Co., Ltd., Suwon-si (KR)

(72) Inventors: Gilwon Lee, McKinney, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 18/169,042

(22) Filed: Feb. 14, 2023

(65) Prior Publication Data

US 2023/0283344 A1    Sep. 7, 2023

Related U.S. Application Data

(60) Provisional application No. 63/421,035, filed on Oct. 31, 2022, provisional application No. 63/418,327, filed on Oct. 21, 2022, provisional application No. 63/326,601, filed on Apr. 1, 2022, provisional application No. 63/315,363, filed on Mar. 1, 2022.

(51) Int. Cl.
*H04B 7/06* (2006.01)
*H04B 7/024* (2017.01)
*H04B 7/0413* (2017.01)

(52) U.S. Cl.
CPC ........... *H04B 7/0626* (2013.01); *H04B 7/024* (2013.01); *H04B 7/0413* (2013.01); *H04B 7/0639* (2013.01)

(58) Field of Classification Search
None
See application file for complete search history.

(56) References Cited

U.S. PATENT DOCUMENTS

2018/0212800 A1   7/2018   Park et al.
2023/0131045 A1*  4/2023   Huang ............... H04L 5/0023
                                                375/267

FOREIGN PATENT DOCUMENTS

WO    2021159460 A1    8/2021

OTHER PUBLICATIONS

International Search Report and Written Opinion issued May 31, 2023 regarding International Application No. PCT/KR2023/002738, 8 pages.

(Continued)

*Primary Examiner* — Minh Trang T Nguyen

(57) ABSTRACT

Apparatuses and methods for CSI codebook for multi-TRP. a method for operating a user equipment (UE) is provided. The method includes receiving a configuration about a channel state information (CSI) report. The configuration includes information about (i) N>1 groups of CSI reference signal (CSI-RS) ports and (ii) a codebook. The codebook includes a spatial-domain (SD) basis component. The SD basis component includes $L_r$ basis vectors for each group r=1, . . . , N. The method further includes, based on the configuration, measuring the N groups of CSI-RS ports and identifying, based on the measurement, the SD basis component. The method further includes transmitting the CSI report. The $L_r$ values for r=1, . . . , N are indicated by a joint indicator. The joint indicator is a function of the $L_r$ values.

15 Claims, 14 Drawing Sheets

(56) References Cited

OTHER PUBLICATIONS

Intel Corporation, "On CSI enhancements for MTRP and FDD reciprocity", 3GPP TSG RAN WG1 103-e, R1-2009452, Nov. 2020, 13 pages.
ZTE, "CSI enhancements for Multi-TRP and FR1 FDD reciprocity", 3GPP TSG RAN WG1 #103-e, R1-2007769, Nov. 2020, 13 pages.
CATT, "CSI enhancements for MTRP and FR1 FDD with partial reciprocity", 3GPP TSG RAN WG1 Meeting #103-e, R1-2007830, Nov. 2020, 10 pages.
"3rd Generation Partnership Project; Technical Specification Group Radio Access Network; Evolved Universal Terrestrial Radio Access (E-UTRA); Physical channels and modulation (Release 17)", 3GPP TS 36.211 V17.2.0, Jun. 2022, 250 pages.
"LTE; Evolved Universal Terrestrial Radio Access (E-UTRA); Multiplexing and channel coding (3GPP TS 36.212 version 17.1.0 Release 17)", ETSI TS 136 212 V17.1.0, Apr. 2022, 264 pages.
"3rd Generation Partnership Project; Technical Specification Group Radio Access Network; Evolved Universal Terrestrial Radio Access (E-UTRA); Physical layer procedures (Release 17)", 3GPP TS 36.213 V17.2.0, Jun. 2022, 584 pages.
"LTE; Evolved Universal Terrestrial Radio Access (E-UTRA); Medium Access Control (MAC) protocol specification (3GPP TS 36.321 version 17.1.0 Release 17)", ETSI TS 136 321 V17.1.0, Aug. 2022, 147 pages.
"LTE; Evolved Universal Terrestrial Radio Access (E-UTRA); Radio Resource Control (RRC); Protocol specification (3GPP Ts 36.331 version 17.1.0 Release 17)", ETSI TS 136 331 V17.1.0, Aug. 2022, 1135 pages.
"3rd Generation Partnership Project; Technical Specification Group Radio Access Network; NR; Physical channels and modulation (Release 17)", 3GPP TS 38.211 V17.2.0, Jun. 2022, 136 pages.
"3rd Generation Partnership Project; Technical Specification Group Radio Access Network; NR; Multiplexing and channel coding (Release 17)", 3GPP TS 38.212 V17.2.0, Jun. 2022, 201 pages.
"3rd Generation Partnership Project; Technical Specification Group Radio Access Network; NR; Physical layer procedures for control (Release 17)", 3GPP TS 38.213 V17.2.0, Jun. 2022, 256 pages.
"3rd Generation Partnership Project; Technical Specification Group Radio Access Network; NR; Physical layer procedures for data (Release 17)," 3GPP TS 38.214 V17.2.0, Jun. 2022, 228 pages.
5G; NR; Physical layer measurements (3GPP TS 38.215 version 17.1.0 Release 17), ETSI TS 138 215 V17.1.0, Apr. 2022, 32 pages.
"5G; NR; Medium Access Control (MAC) protocol specification (3GPP TS 38.321 version 17.1.0 Release 17)", ETSI TS 138 321 V17.1.0, Aug. 2022, 244 pages.
"5G; NR; Radio Resource Control (RRC); Protocol specification (3GPP TS 38.331 version 17.1.0 Release 17)", ETSI TS 138 331 V17.1.0, Aug. 2022, 1257 pages.

\* cited by examiner

CSI CODEBOOK FOR MULTI-TRP

CROSS-REFERENCE TO RELATED APPLICATION AND CLAIM OF PRIORITY

This application claims priority under 35 U.S.C. § 119(e) to U.S. Provisional Patent Application No. 63/315,363 filed on Mar. 1, 2022, U.S. Provisional Patent Application No. 63/326,601 filed on Apr. 1, 2022, U.S. Provisional Patent Application No. 63/418,327 filed on Oct. 21, 2022, and U.S. Provisional Patent Application No. 63/421,035 filed on Oct. 31, 2022. The above-identified provisional patent applications are hereby incorporated by reference in their entirety.

TECHNICAL FIELD

The present disclosure relates generally to wireless communication systems and, more specifically, to a channel state information (CSI) codebook for multi-transmit receive point (TRP).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for CSI codebook for multi-TRP.

In one embodiment, a user equipment (UE) is provided. The UE includes a transceiver configured to receive a configuration about a CSI report. The configuration includes information about (i) N>1 groups of CSI reference signal (CSI-RS) ports and (ii) a codebook. The codebook includes a spatial-domain (SD) basis component. The SD basis component includes $L_r$ basis vectors for each group $r=1, \ldots, N$. The UE further includes a processor operably coupled to the transceiver. The processor, based on the configuration, is configured to measure the N groups of CSI-RS ports and identify, based on the measurement, the SD basis component. The transceiver is further configured to transmit the CSI report. The $L_r$ values for $r=1, \ldots, N$ are indicated by a joint indicator. The joint indicator is a function of the $L_r$ values.

In another embodiment, a base station (BS) is provided. The BS includes a processor configured to generate a configuration about a CSI report. The configuration includes information about (i) N>1 groups of CSI-RS ports and (ii) a codebook. The codebook includes a SD basis component. The SD basis component includes $L_r$ basis vectors for each group $r=1, \ldots, N$. The BS further includes a transceiver operably coupled to the processor. The transceiver is configured to transmit the configuration and receive the CSI report that is based on the N groups of CSI-RS ports and the SD basis component. The $L_r$ values for $r=1, \ldots, N$ are indicated by a joint indicator. The joint indicator is a function of the $L_r$ values.

In yet another embodiment, a method for operating a UE is provided. The method includes receiving a configuration about a CSI report. The configuration includes information about (i) N>1 groups of CSI-RS ports and (ii) a codebook. The codebook includes a SD basis component. The SD basis component includes $L_r$ basis vectors for each group $r=1, \ldots, N$. The method further includes, based on the configuration, measuring the N groups of CSI-RS ports and identifying, based on the measurement, the SD basis component. The method further includes transmitting the CSI report. The $L_r$ values for $r=1, \ldots, N$ are indicated by a joint indicator. The joint indicator is a function of the $L_r$ values.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
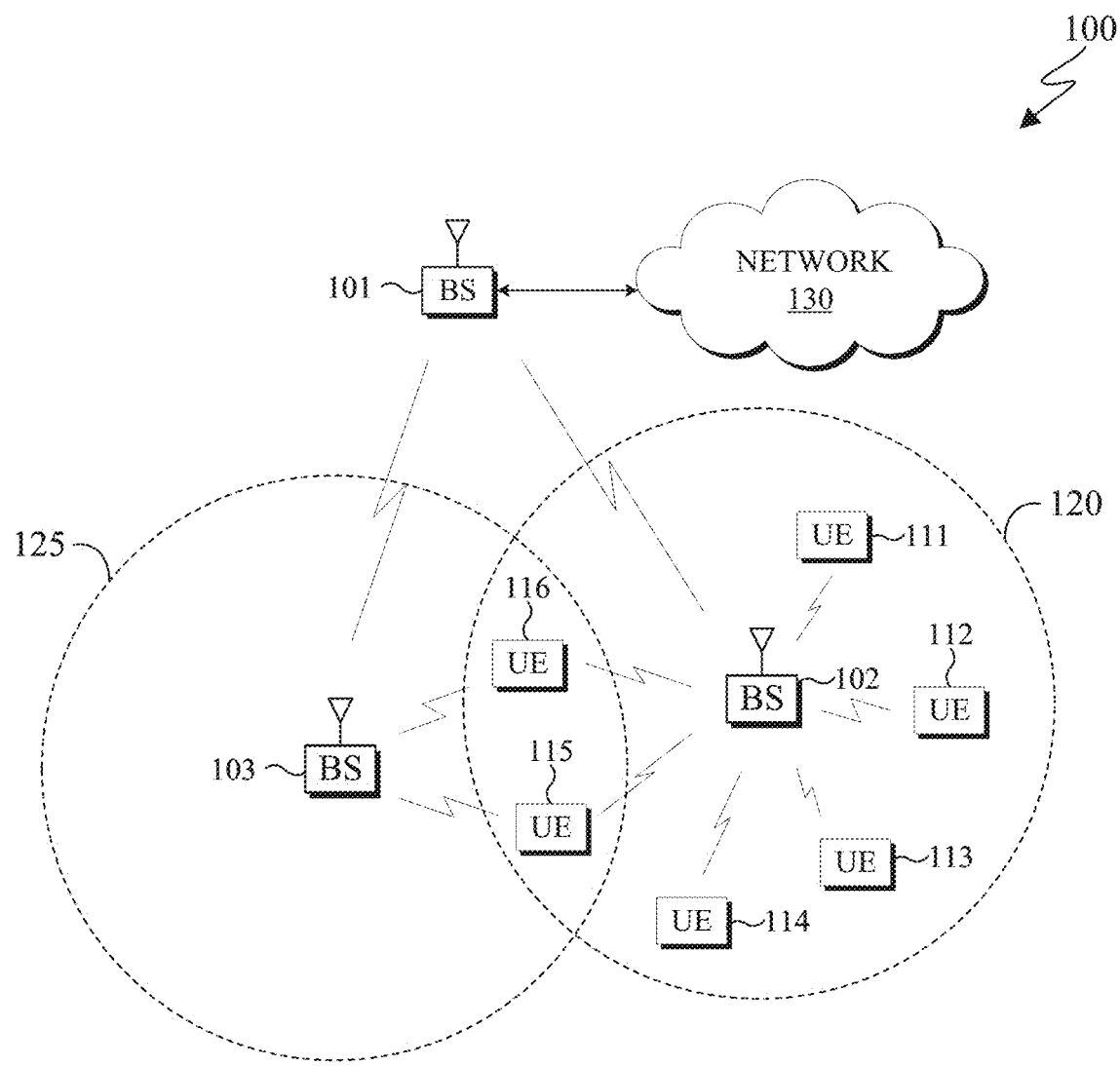
FIG. 1 illustrates an example wireless network according to embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v 17.2.0, "E-UTRA, Physical channels and modulation" (herein "REF 1"); 3GPP TS 36.212 v 17.1.0, "E-UTRA, Multiplexing and Channel coding" (herein "REF 2"); 3GPP TS 36.213 v 17.2.0, "E-UTRA, Physical Layer Procedures" (herein "REF 3"); 3GPP TS 36.321 v 17.1.0, "E-UTRA, Medium Access Control (MAC) protocol specification" (herein "REF 4"); 3GPP TS 36.331 v 17.1.0, "E-UTRA, Radio Resource Control (RRC) protocol specification" (herein "REF 5"); 3GPP TS 38.211 v 17.2.0, "NR, Physical Channels and Modulation" (herein "REF 6"); 3GPP TS 38.212 v 17.2.0, "NR, Multiplexing and channel coding" (herein "REF 7"); 3GPP TS 38.213 v 17.2.0, "NR, Physical Layer Procedures for Control" (herein "REF 8"); 3GPP TS 38.214 v 17.2.0; "NR, Physical Layer Procedures for Data" (herein "REF 9"); 3GPP TS 38.215 v 17.1.0; "NR, Physical Layer Measurements" (herein "REF 10"); 3GPP TS 38.321 v 17.1.0; "NR, Medium Access Control (MAC) Protocol Specification" (herein "REF 11"); and 3GPP TS 38.331 v 17.1.0; "NR, Radio Resource Control (RRC) Protocol Specification" (herein "REF 12")

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The present disclosure considers distributed MIMO and proposes a CSI codebook design to support distributed MIMO or multi-TRP (mTRP) operations.

Figure 2:
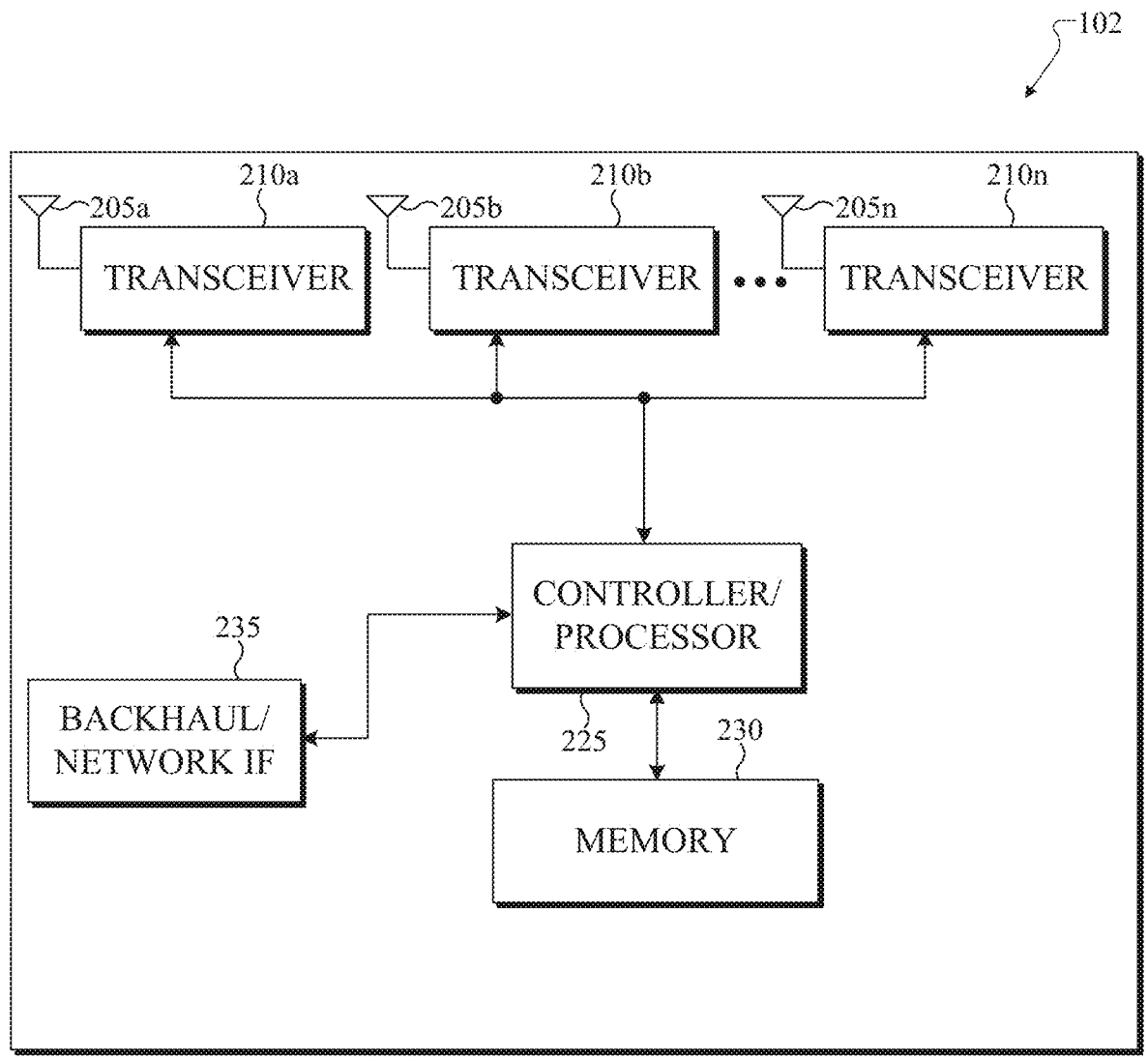
FIG. 2 illustrates an example gNB according to embodiments of the present disclosure.
Figure 3:
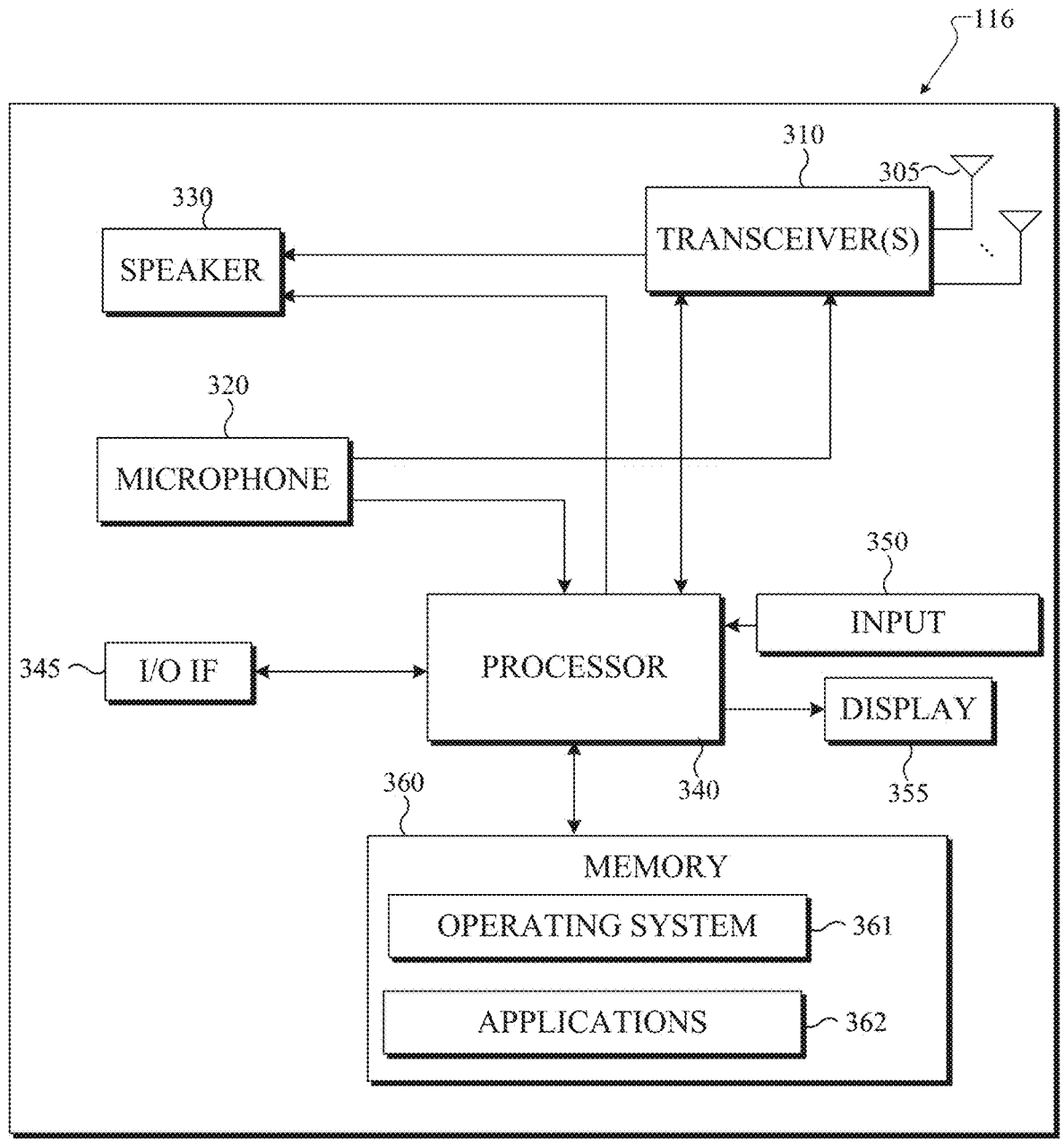
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting CSI codebook for multi-TRP. In certain embodiments, one or more of the BSs 101-103 include circuitry, programing, or a combination thereof for supporting CSI codebook for multi-TRP.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting CSI codebook for multi-TRP. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
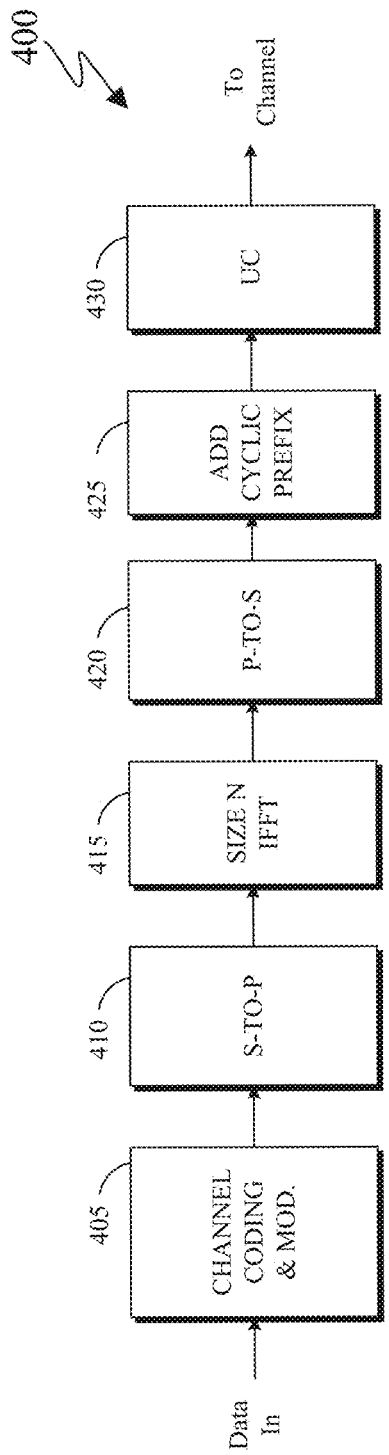
FIGS. 4 and 5 illustrate example wireless transmit and receive paths according to embodiments of the present disclosure.
Figure 5:
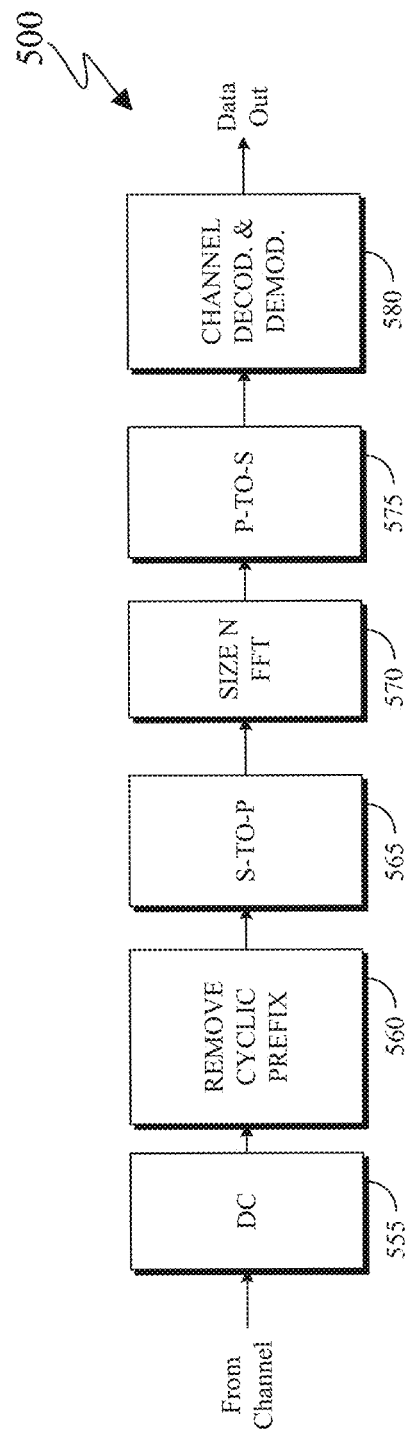

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support CSI codebook for multi-TRP as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
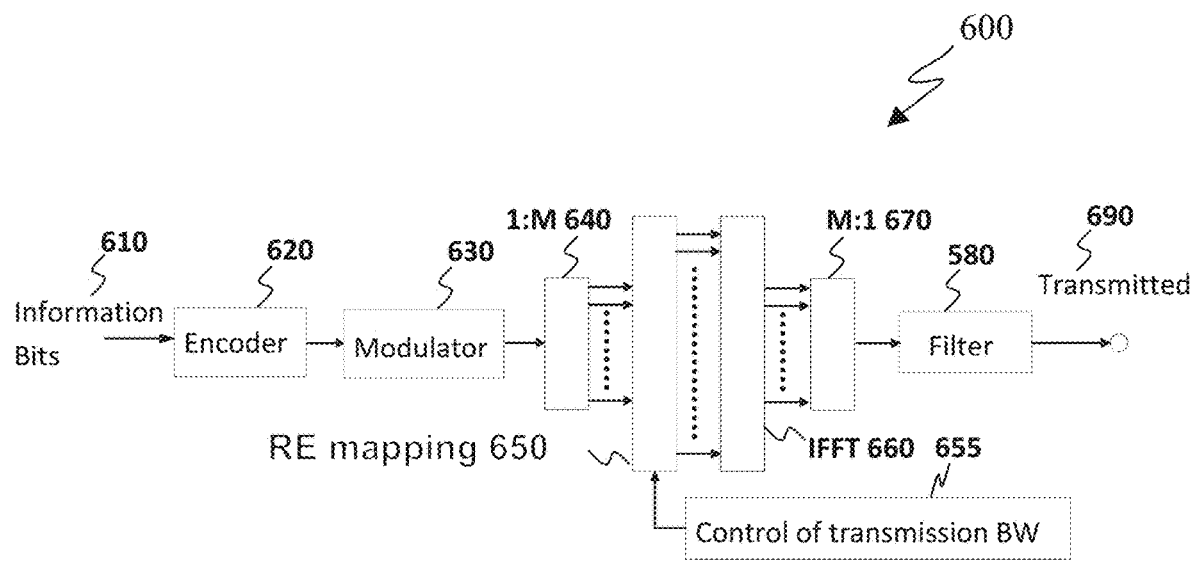
FIG. 6 illustrates a transmitter block diagram for a physical downlink shared channel (PDSCH) in a subframe according to embodiments of the present disclosure.

FIG. 6 illustrates a transmitter block diagram 600 for a PDSCH in a subframe according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
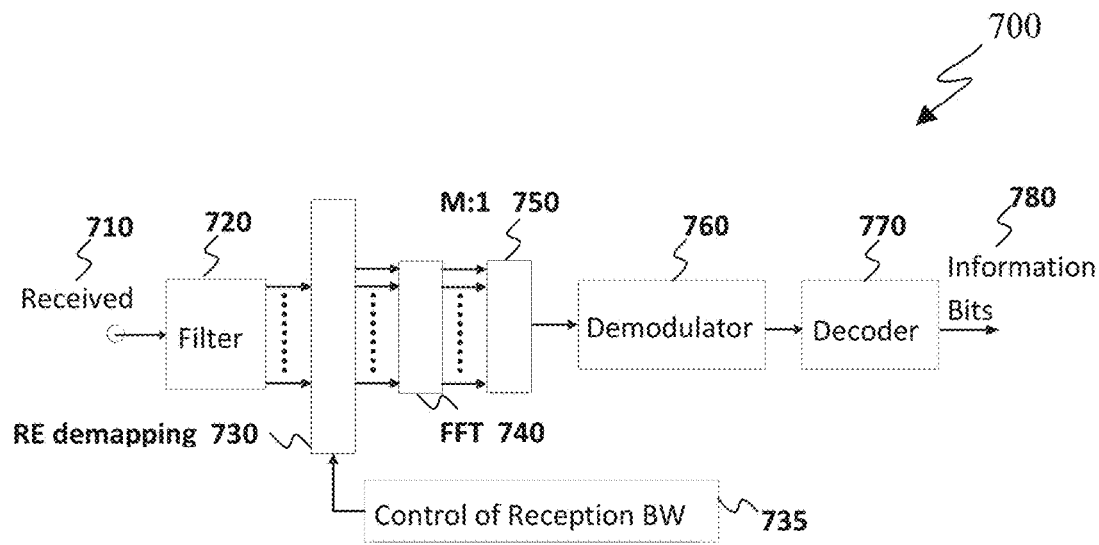
FIG. 7 illustrates a receiver block diagram for a PDSCH in a subframe according to embodiments of the present disclosure.

FIG. 7 illustrates a receiver block diagram 700 for a PDSCH in a subframe according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
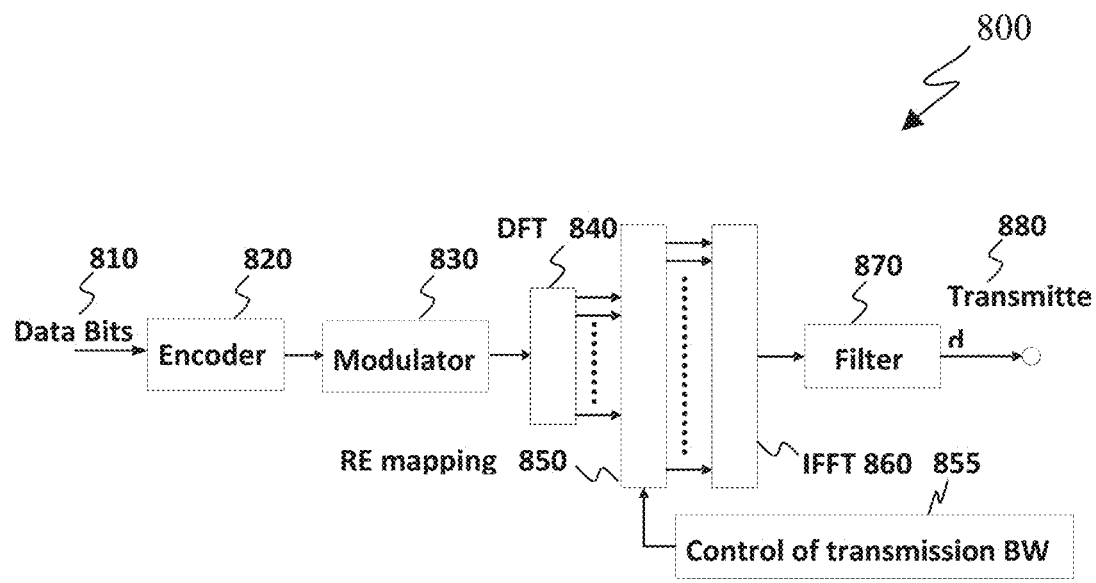
FIG. 8 illustrates a transmitter block diagram for a physical uplink shared channel (PUSCH) in a subframe according to embodiments of the present disclosure.

FIG. 8 illustrates a transmitter block diagram 800 for a PUSCH in a subframe according to embodiments of the present disclosure. The embodiment of the block diagram 800 illustrated in FIG. 8 is for illustration only. One or more of the components illustrated in FIG. 6 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
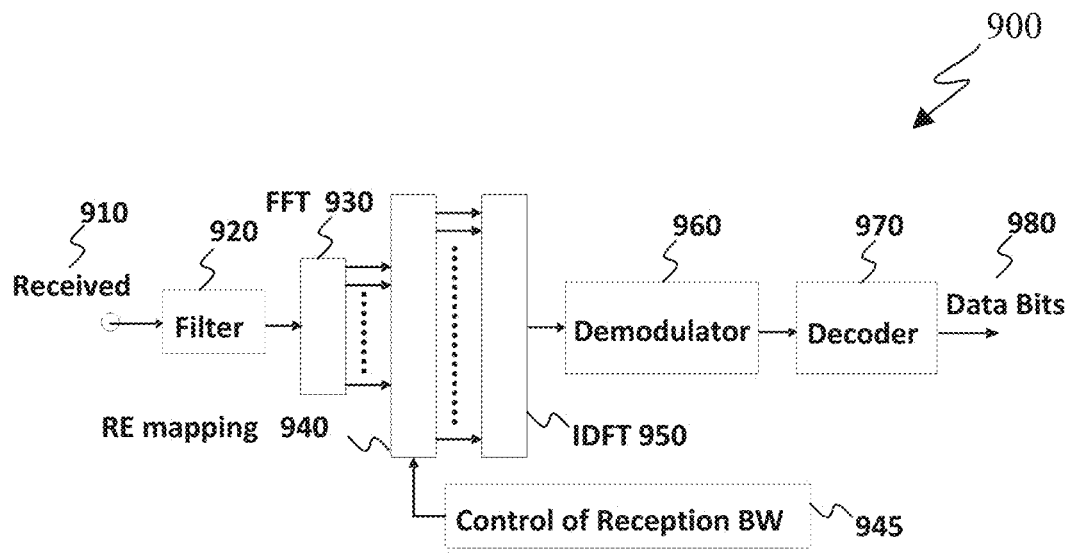
FIG. 9 illustrates a receiver block diagram for a PUSCH in a subframe according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port.

Figure 10:
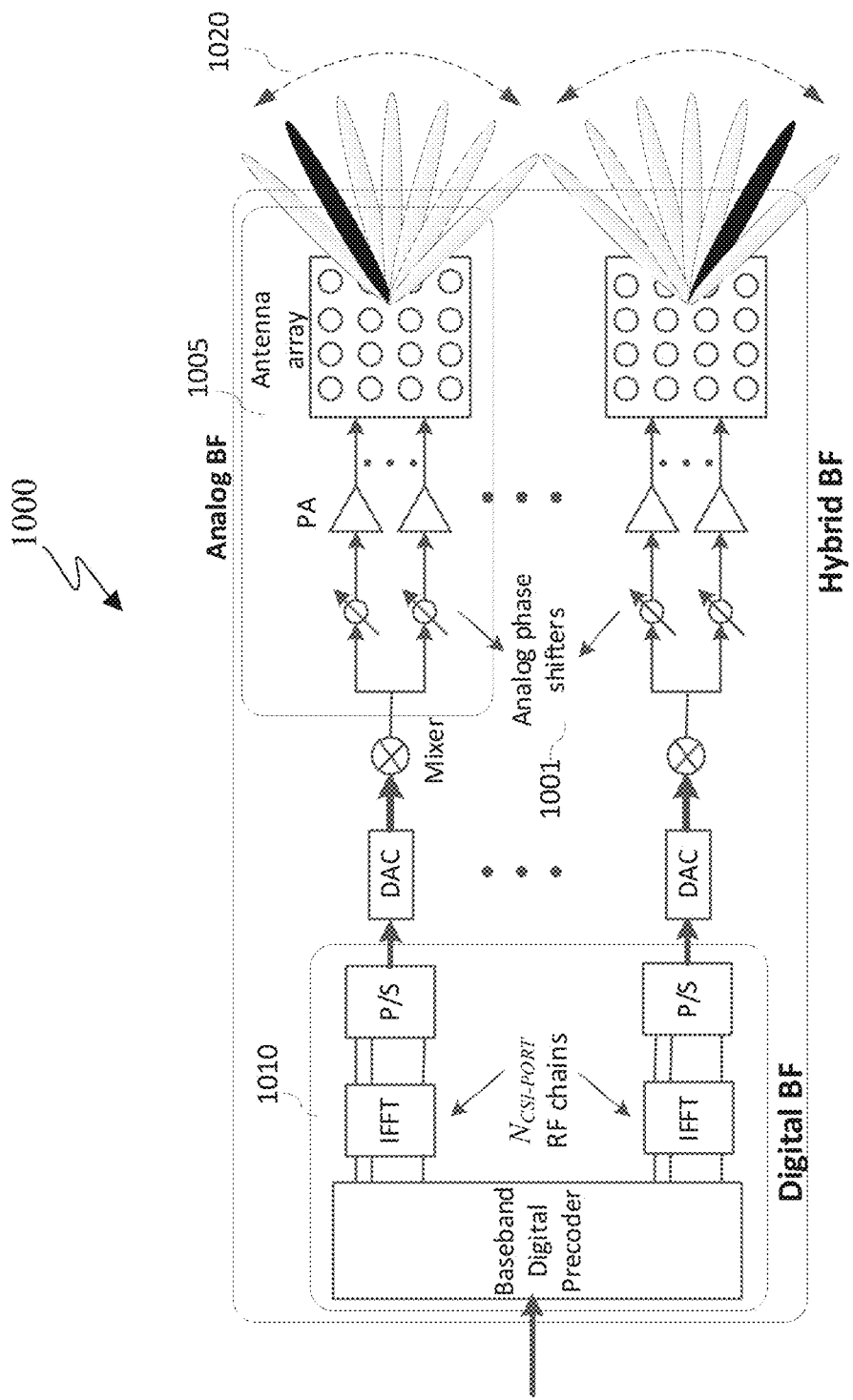
FIG. 10 illustrates an example antenna blocks or arrays forming beams according to embodiments of the present disclosure.

FIG. 10 illustrates an example antenna blocks or arrays 1000 according to embodiments of the present disclosure. The embodiment of the antenna blocks or arrays 1000 illustrated in FIG. 10 is for illustration only. FIG. 10 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports $N_{CSI-PORT}$. A digital beamforming unit 1010 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

At lower frequency bands such as FR1 or particularly sub-1 GHz band, on the other hand, the number of antenna elements cannot be increased in a given form factor due to large wavelength. As an example, for the case of the wavelength size ($\lambda$) of the center frequency 600 MHz (which is 50 cm), it requires 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports, such as 32 CSI-RS ports, becomes very large in such low frequency bands, and it leads to the difficulty of deploying 2-D antenna arrays within the size of a conventional form factor. This can result in a limited number of CSI-RS ports that can be supported at a single site and limits the spectral efficiency of such systems.

CSI enhancement described in Rel-18 MIMO considers Rel-16/17 Type-II CSI codebook refinements to support mTRP coherent joint transmission (C-JT) operations by considering performance-and-overhead trade-off. The Rel-16/17 Type-II CSI codebook has three components $W_1$, $W_2$, and $W_f$. In this disclosure, we provide several inventions on $W_1$ and $W_f$ to alleviate amount of CSI reporting overhead to have good performance-and-overhead trade-off for C-JT operations.

In the present disclosure, components $W_1$, and $W_f$ based on Rel-16/17 Type-II CSI codebook are extended to support mTRP (C-JT) operations to have good performance-and-overhead trade-off.

Figure 11:
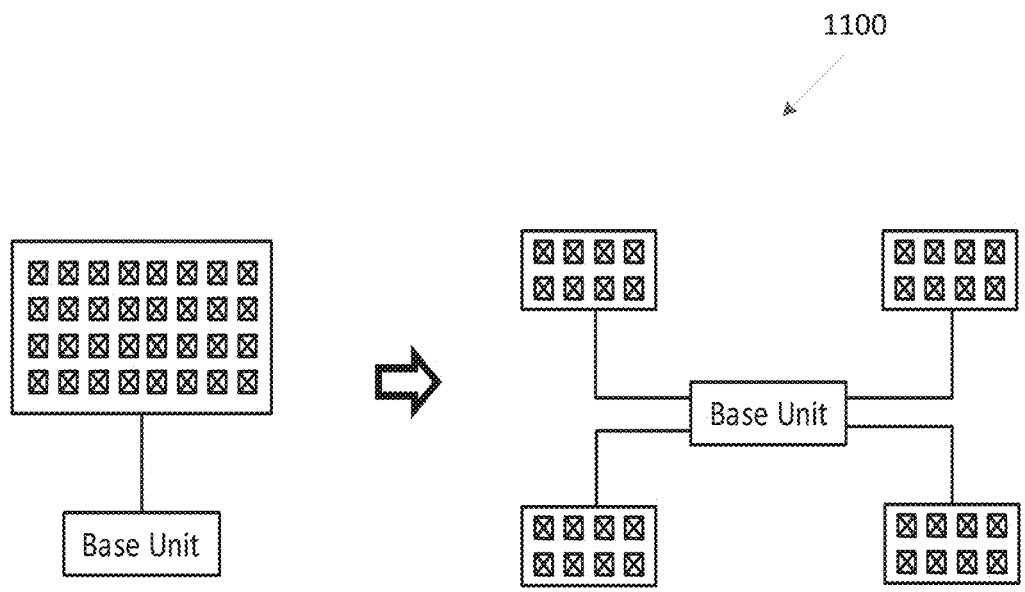
FIG. 11 illustrates an example D-MIMO system according to embodiments of the present disclosure.

FIG. 11 illustrates an example system for D-MIMO 1100 according to embodiments of the present disclosure. The embodiment of the example system for D-MIMO 1100 illustrated in FIG. 11 is for illustration only. FIG. 11 does not limit the scope of this disclosure to any particular implementation of the example system for D-MIMO.

As illustrated in FIG. 11, one approach to resolving the issue described above is to form multiple TRPs (multi-TRP) or RRHs with a small number of antenna ports instead of integrating all of the antenna ports in a single panel (or at a single site) and to distribute the multiple panels in multiple locations/sites (or TRPs, RRHs). This approach, the concept of distributed MIMO (D-MIMO), is shown in FIG. 11.

Figure 12:
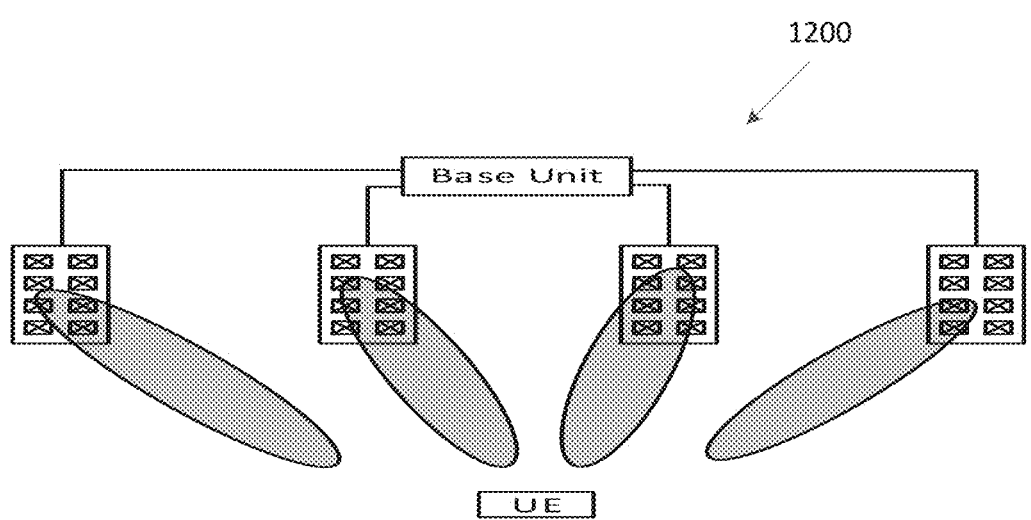
FIG. 12 illustrates an example distributed multiple-input multiple-output (D-MIMO) system according to embodiments of the present disclosure.

FIG. 12 illustrates an example system for D-MIMO 1200 according to embodiments of the present disclosure. The embodiment of the example system for D-MIMO 1200 illustrated in FIG. 12 is for illustration only. FIG. 12 does not limit the scope of this disclosure to any particular implementation of the example system for D-MIMO.

As illustrated in FIG. 12, the multiple TRPs at multiple locations can still be connected to a single base unit, and thus the signal transmitted/received via multiple distributed TRPs can be processed in a centralized manner through the single base unit.

If existing codebook design for single TRP is applied to a multi-TRP operation, it would result in a CSI report with large number of quantities leading to increased overhead. Embodiments presented in the present disclosure relate to CSI codebook design for multi-TRP operation considering the tradeoffs between performance and overhead. By allowing asymmetric number of quantities of a spatial-domain component across multi-TRP, the number of quantities reported in the CSI report are optimized resulting in overhead-and-performance trade-off.

Note that although low frequency band systems (sub-1 GHz band) have been mentioned as a motivation for distributed MIMO (or mTRP), the distributed MIMO technology is frequency-band-agnostic and can be useful in mid- (sub-6 GHz) and high-band (above-6 GHz) systems in addition to low-band (sub-1 GHz) systems.

The terminology "distributed MIMO" is used as an illustrative purpose, it can be considered under another terminology such as multi-TRP, mTRP, cell-free network, and so on.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI or calibration coefficient reporting can be defined in terms of frequency "subbands" and "CSI reporting band" (CRB), respectively.

A subband for CSI or calibration coefficient reporting is defined as a set of contiguous PRBs which represents the smallest frequency unit for CSI or calibration coefficient reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI or calibration coefficient reporting setting.

"CSI or calibration coefficient reporting band" is defined as a set/collection of subbands, either contiguous or non-contiguous, wherein CSI or calibration coefficient reporting is performed. For example, CSI or calibration coefficient reporting band can include all the subbands within the DL system bandwidth. This can also be termed "full-band". Alternatively, CSI or calibration coefficient reporting band can include only a collection of subbands within the DL system bandwidth. This can also be termed "partial band".

The term "CSI or calibration coefficient reporting band" is used only as an example for representing a function. Other terms such as "CSI or calibration coefficient reporting subband set" or "CSI or calibration coefficient reporting bandwidth" can also be used.

In terms of UE configuration, a UE can be configured with at least one CSI or calibration coefficient reporting band. This configuration can be semi-static (via higher-layer signaling or RRC) or dynamic (via MAC CE or L1 DL control signaling). When configured with multiple (N) CSI or calibration coefficient reporting bands (e.g., via RRC signaling), a UE can report CSI associated with n≤N CSI reporting bands. For instance, >6 GHz, large system bandwidth may require multiple CSI or calibration coefficient reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 13:
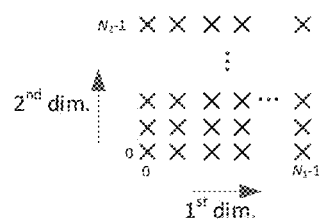
FIG. 13 illustrates an example antenna port layout according to embodiments of the present disclosure.
Figure 13:
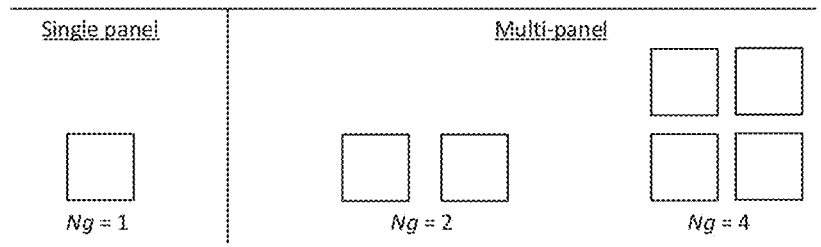

FIG. 13 illustrates an example antenna port layout 1300 according to embodiments of the present disclosure. The embodiment of the antenna port layout 1300 illustrated in FIG. 13 is for illustration only. FIG. 13 does not limit the scope of this disclosure to any particular implementation of the antenna port layout.

As illustrated in FIG. 13, $N_1$ and $N_2$ are the number of antenna ports with the same polarization in the first and second dimensions, respectively. For 2D antenna port layouts, $N_1 > 1$, $N_2 > 1$, and for 1D antenna port layouts $N_1 > 1$ and $N_2 = 1$. Therefore, for a dual-polarized antenna port layout, the total number of antenna ports is $2N_1N_2$ when each antenna maps to an antenna port. An illustration is shown in FIG. 13 where "X" represents two antenna polarizations. In the present disclosure, the term "polarization" refers to a group of antenna ports. For example, antenna ports $$j = X + 0, X + 1, \ldots, X + \frac{P_{CSIRS}}{2} - 1$$

comprise a first antenna polarization, and antenna ports $$j = X + \frac{P_{CSIRS}}{2}, X + \frac{P_{CSIRS}}{2} + 1, \ldots, X + P_{CSIRS} - 1$$

comprise a second antenna polarization, where $P_{CSIRS}$ is a number of CSI-RS antenna ports and X is a starting antenna port number (e.g., X=3000, then antenna ports are 3000, 3001, 3002, . . . ). Let $N_g$ be a number of antenna panels at the gNB. When there are multiple antenna panels ($N_g > 1$), we assume that each panel is dual-polarized antenna ports with $N_1$ and $N_2$ ports in two dimensions. This is illustrated in FIG.

13. Note that the antenna port layouts may or may not be the same in different antenna panels.

In one example, the antenna architecture of a D-MIMO or CJT (coherent joint transmission) system is structured. For example, the antenna structure at each RRH (or TRP) is dual-polarized (single or multi-panel as shown in FIG. 13. The antenna structure at each RRH/TRP can be the same. Alternatively, the antenna structure at an RRH/TRP can be different from another RRH/TRP. Likewise, the number of ports at each RRH/TRP can be the same. Alternatively, the number of ports at one RRH/TRP can be different from another RRH/TRP. In one example, $N_g = N_{RRH}$, a number of RRHs/TRPs in the D-MIMO transmission.

In another example, the antenna architecture of a D-MIMO or CJT system is unstructured. For example, the antenna structure at one RRH/TRP can be different from another RRH/TRP.

We assume a structured antenna architecture in the rest of the disclosure. For simplicity, we assume each RRH/TRP is equivalent to a panel, although, an RRH/TRP can have multiple panels in practice. The disclosure however is not restrictive to a single panel assumption at each RRH/TRP, and can easily be extended (covers) the case when an RRH/TRP has multiple antenna panels.

In one embodiment, an RRH constitutes (or corresponds to or is equivalent to) at least one of the following:

In one example, an RRH corresponds to a TRP.

In one example, an RRH or TRP corresponds to a CSI-RS resource. A UE is configured with $K = N_{RRH} > 1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure.

In one example, an RRH or TRP corresponds to a CSI-RS resource group, where a group comprises one or multiple NZP CSI-RS resources. A UE is configured with $K \geq N_{RRH} > 1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure. In particular, the K CSI-RS resources can be partitioned into $N_{RRH}$ resource groups. The information about the resource grouping can be provided together with the CSI-RS resource setting/configuration, or with the CSI reporting setting/configuration, or with the CSI-RS resource configuration.

In one example, an RRH or TRP corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.

In one example, an RRH or TRP corresponds to one or more examples described above depending on a configuration. For example, this configuration can be explicit via a parameter (e.g., an RRC parameter). Alternatively, the configuration can be implicit.

a. In one example, when implicit, it could be based on the value of K. For example, when K>1 CSI-RS resources, an RRH corresponds to one or more examples described above, and when K=1 CSI-RS resource, an RRH corresponds to one or more examples described above.

b. In another example, the configuration could be based on the configured codebook. For example, an RRH corresponds to a CSI-RS resource or resource group when the codebook corresponds to a decoupled codebook (modular or separate codebook for each RRH), and an RRH corresponds to a subset (or a group) of CSI-RS ports when codebook corresponds to a coupled (joint or coherent) codebook (one joint codebook across TRPs/RRHs).

In one example, when RRH or TRP maps (or corresponds to) a CSI-RS resource or resource group, and a UE can select a subset of TRPs/RRHs (resources or resource groups) and report the CSI for the selected TRPs/RRHs (resources or resource groups), the selected TRPs/RRHs can be reported via an indicator. For example, the indicator can be a CRI or a PMI (component) or a new indicator.

In one example, when RRH or TRP maps (or corresponds to) a CSI-RS port group, and a UE can select a subset of TRPs/RRHs (port groups) and report the CSI for the selected TRPs/RRHs (port groups), the selected TRPs/RRHs can be reported via an indicator. For example, the indicator can be a CRI or a PMI (component) or a new indicator.

In one example, when multiple (K>1) CSI-RS resources are configured for $N_{RRH}$ TRPs/RRHs, a decoupled (modular) codebook is used/configured, and when a single (K=1) CSI-RS resource for $N_{RRH}$ RRHs, a joint codebook is used/configured.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination-based Type II CSI reporting framework is extended to include a frequency dimension in addition to the first and second antenna port dimensions.

Figure 14:
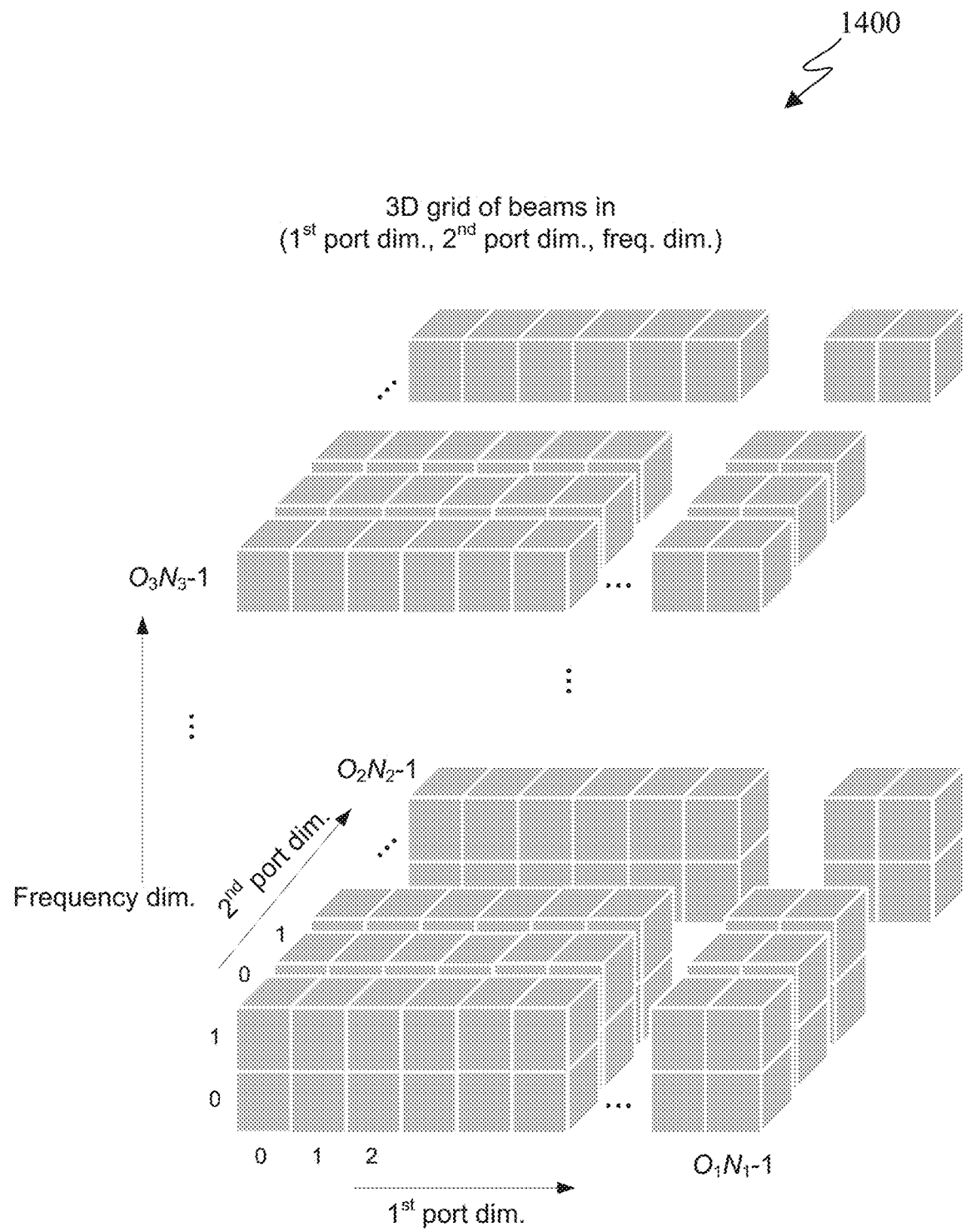
FIG. 14 illustrates a three dimensional (3D) grid of oversampled discrete Fourier transform (DFT) beams according to embodiments of the present disclosure.

FIG. 14 illustrates a 3D grid of oversampled DFT beams 1400 according to embodiments of the present disclosure. The embodiment of the 3D grid of oversampled DFT beams 1400 illustrated in FIG. 14 is for illustration only. FIG. 14 does not limit the scope of this disclosure to any particular implementation of the 3D grid of oversampled DFT beams.

As illustrated, FIG. 14 shows a 3D grid 1400 of the oversampled DFT beams (1st port dim., 2nd port dim., freq. dim.) in which 1st dimension is associated with the 1st port dimension, 2nd dimension is associated with the 2nd port dimension, and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1 = O_2 = O_3 = 4$. In one example, $O_1 = O_2 = 4$ and $O_3 = 1$. In another example, the oversampling factors $O_i$ belongs to {2, 4, 8}. In yet another example, at least one of $O_1$, $O_2$, and $O_3$ is higher layer configured (via RRC signaling).

As explained in Section 5.2.2.2.6 of REF8, a UE is configured with higher layer parameter codebookType set to 'typeII-PortSelection-r16' for an enhanced Type II CSI reporting in which the pre-coders for all SBs and for a given layer l=1, . . . , v, where v is the associated RI value, is given by either $$W^l = AC_l B^H = \begin{bmatrix} a_0 & a_1 & \cdots & a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} \begin{bmatrix} b_0 & b_1 & \cdots & b_{M-1} \end{bmatrix}^H = $$
$$\sum_{f=0}^{M-1} \sum_{i=0}^{L-1} c_{l,i,f}(a_i b_f^H) = \sum_{i=0}^{L-1} \sum_{f=0}^{M-1} c_{l,i,f}(a_i b_f^H) \quad \text{(Eq. 1)}$$

or $$W^l = \begin{bmatrix} A & 0 \\ 0 & A \end{bmatrix} C_l B^H = \quad \text{(Eq. 2)}$$

$$\begin{bmatrix} a_0 a_1 \cdots a_{L-1} & 0 \\ 0 & a_0 a_1 \cdots a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} \begin{bmatrix} b_0 & b_1 & \cdots & b_{M-1} \end{bmatrix}^H = $$

$$\begin{bmatrix} \sum_{f=0}^{M-1} \sum_{i=0}^{L-1} c_{l,i,f}(a_i b_f^H) \\ \sum_{f=0}^{M-1} \sum_{i=0}^{L-1} c_{l,i+L,f}(a_i b_f^H) \end{bmatrix},$$

where
- $N_1$ is a number of antenna ports in a first antenna port dimension (having the same antenna polarization),
- $N_2$ is a number of antenna ports in a second antenna port dimension (having the same antenna polarization),
- $P_{CSI-RS}$ is a number of CSI-RS ports configured to the UE,
- $N_3$ is a number of SBs for PMI reporting or number of FD units or number of FD components (that comprise the CSI reporting band) or a total number of precoding matrices indicated by the PMI (one for each FD unit/component),
- $a_i$ is a $2N_1 N_2 \times 1$ (Eq. 1) or $N_1 N_2 \times 1$ (Eq. 2) column vector, or $a_i$ is a $P_{CSIRS} \times 1$ (Eq. 1) or $$\frac{P_{CSIRS}}{2} \times 1$$

port selection column vector, where a port selection vector is a defined as a vector which contains a value of 1 in one element and zeros elsewhere
- $b_f$ is a $N_3 \times 1$ column vector,
- $c_{l,i,f}$ is a complex coefficient.

In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f} \times c_{l,i,f}$ where
- $x_{l,i,f}=1$ if the coefficient $c_{l,i,f}$ is reported by the UE according to some embodiments of this disclosure.
- $x_{l,i,f}=0$ otherwise (i.e., $c_{l,i,f}$ is not reported by the UE).

The indication whether $x_{l,i,f}=1$ or 0 is according to some embodiments of this disclosure. For example, it can be via a bitmap.

In a variation, the precoder equations Eq. 1 or Eq. 2 are respectively generalized to $$W^l = \sum_{i=0}^{L-1} \sum_{f=0}^{i-1} c_{l,i,f}(a_i b_{i,f}^H) \quad \text{(Eq. 3)}$$

and $$W^l = \begin{bmatrix} \sum_{i=0}^{L-1} \sum_{f=0}^{M_i-1} c_{l,i,f}(a_i b_{i,f}^H) \\ \sum_{i=0}^{L-1} \sum_{f=0}^{M_i-1} c_{l,i+L,f}(a_i b_{i,f}^H) \end{bmatrix}, \quad \text{(Eq. 4)}$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}} \begin{bmatrix} W^1 & W^2 & \cdots & W^R \end{bmatrix}.$$

Eq. 2 is assumed in the rest of the disclosure. The embodiments of the disclosure, however, are general and are also application to Eq. 1, Eq. 3 and Eq. 4.

Here $$L \leq \frac{P_{CSI-RS}}{2}$$

and $M \leq N_3$. If $$L = \frac{P_{CSI-RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f = w_f$, where the quantity $w_f$ is given by $$w_f = \left[ 1 \quad e^{j\frac{2\pi n_{3,l}^{(f)}}{O_3 N_3}} \quad e^{j\frac{2\pi \cdot 2 n_{3,l}^{(f)}}{O_3 N_3}} \quad \ldots \quad e^{j\frac{2\pi \cdot (N_3-1) n_{3,l}^{(f)}}{O_3 N_3}} \right]^T.$$

When $O_3=1$, the FD basis vector for layer $l \in \{1, \ldots, \upsilon\}$ (where $\upsilon$ is the RI or rank value) is given by $$w_f = [y_{0,l}^{(f)} y_{1,l}^{(f)} \ldots y_{N_3-1,l}^{(f)}]^T,$$

where $$y_{t,l}^{(f)} = e^{j\frac{2\pi t n_{3,l}^{(f)}}{N_3}}$$

and $n_{3,l} = [n_{3,l}^{(0)}, \ldots, n_{3,l}^{(M-1)}]$ where $m_{3,l}^{(f)} \in \{0, 1, \ldots, N_3-1\}$.

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases},$$

and $K=N_3$, and $m=0, \ldots, N_3-1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \quad \text{(Eq. 5)}$$

where $A=W_1$ corresponds to the Rel. 15 $W_1$ in Type II CSI codebook [REFS], and $B=W_f$.

The $C_l = \tilde{W}_2$ matrix consists of all the required linear combination coefficients (e.g., amplitude and phase or real or imaginary). Each reported coefficient ($c_{l,i,f} = p_{l,i,f} \phi_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to $\{2, 3, 4\}$. If multiple values for A are supported, then one value is configured via higher layer signaling. In another example, the amplitude coefficient ($p_{l,i,f}$) is reported as $p_{l,i,f} = p_{l,i,f}^{(1)} p_{l,i,f}^{(2)}$ where $p_{l,i,f}^{(1)}$ is a reference or first amplitude which is reported using an A1-bit amplitude codebook where A1 belongs to $\{2, 3, 4\}$, and $p_{l,i,f}^{(2)}$ is a differential or second amplitude which is reported using a A2-bit amplitude codebook where $A2 \leq A1$ belongs to $\{2, 3, 4\}$.

For layer 1, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and $\beta$ is higher layer configured. The remaining $2LM - K_{NZ}$ coefficients that are not reported by the UE are assumed to be zero. The following quantization scheme is used to quantize/report the $K_{NZ}$ NZ coefficients.

UE reports the following for the quantization of the NZ coefficients in $\tilde{W}_2$ a. An X-bit indicator for the strongest coefficient index (i*, f*), where $X = \lceil \log_2 K_{NZ} \rceil$ or $\lceil \log_2 2L \rceil$.
    i. Strongest coefficient $c_{l,i^*,f^*} = 1$ (hence its amplitude/phase are not reported)
  b. Two antenna polarization-specific reference amplitudes is used.
    i. For the polarization associated with the strongest coefficient $c_{l,i^*,f^*} = 1$, since the reference amplitude $p_{l,i,f}^{(1)} = 1$, is not reported
    ii. For the other polarization, reference amplitude $p_{l,i,f}^{(1)}$ is quantized to 4 bits
      1. The 4-bit amplitude alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}} \right\}.$$

c. For $\{c_{l,i,f}, (i, f) \neq (i^*, f^*)\}$:
    i. For each polarization, differential amplitudes $p_{l,i,f}^{(2)}$ of the coefficients calculated relative to the associated polarization-specific reference amplitude and quantized to 3 bits
      1. The 3-bit amplitude alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}.$$

2. Note: The final quantized amplitude $p_{l,i,f}$ is given by $p_{l,i,f}^{(1)} \times p_{l,i,f}^{(2)}$
    ii. Each phase is quantized to either 8PSK ($N_{ph}=8$) or 16PSK ($N_{ph}=16$) (which is configurable).

For the polarization $r^* \in \{0, 1\}$ associated with the strongest coefficient $C_{l,i^*,f^*}$, we have $$r^* = \left\lfloor \frac{i^*}{L} \right\rfloor$$

and the reference amplitude $p_{l,i,f}^{(1)} = p_{l,r^*}^{(1)} = 1$. For the other polarization $r \in \{0, 1\}$ and $r \neq r^*$, we have $$r = \left( \left\lfloor \frac{i^*}{L} \right\rfloor + 1 \right) \mod 2$$

and the reference amplitude $p_{l,i,f}^{(1)}=p_{l,r}^{(1)}$ is quantized (reported) using the 4-bit amplitude codebook mentioned above.

In Rel. 16 enhanced Type II and Type II port selection codebooks, a UE can be configured to report M FD basis vectors. In one example, $$M = \left\lceil p \times \frac{N_3}{R} \right\rceil,$$

where R is higher-layer configured from {1, 2} and p is higher-layer configured from $$\left\{\frac{1}{4}, \frac{1}{2}\right\}.$$

In one example, the p value is higher-layer configured for rank 1-2 CSI reporting. For rank>2 (e.g., rank 3-4), the p value (denoted by $v_0$) can be different. In one example, for rank 1-4, $(p, v_0)$ is jointly configured from $$\left\{\left(\frac{1}{2}, \frac{1}{4}\right), \left(\frac{1}{4}, \frac{1}{4}\right), \left(\frac{1}{4}, \frac{1}{8}\right)\right\},$$

i.e., $$M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3 = N_{SB} \times R$ where $N_{SB}$ is the number of SBs for CQI reporting. In one example, M is replaced with $M_\upsilon$ to show its dependence on the rank value $\upsilon$, hence p is replaced with $p_\upsilon$, $\upsilon \in \{1, 2\}$ and $\upsilon_0$ is replaced with $p_\upsilon$, $\upsilon \in \{3, 4\}$.

A UE can be configured to report $M_\upsilon$ FD basis vectors in one-step from $N_3$ basis vectors freely (independently) for each layer $l \in \{1, \ldots, \upsilon\}$ of a rank $\upsilon$ CSI reporting. Alternatively, a UE can be configured to report $M_\upsilon$ FD basis vectors in two-step as follows.

In step 1, an intermediate set (InS) comprising $N'_3 < N_3$ basis vectors is selected/reported, wherein the InS is common for all layers.

In step 2, for each layer $l \in \{1, \ldots, \upsilon\}$ of a rank $\upsilon$ CSI reporting, $M_\upsilon$ FD basis vectors are selected/reported freely (independently) from $N'_3$ basis vectors in the InS.

In one example, one-step method is used when $N_3 \leq 19$ and two-step method is used when $N_3 > 19$. In one example, $N'_3 = \lceil \alpha M_\upsilon \rceil$ where $\alpha > 1$ is either fixed (to 2 for example) or configurable.

The codebook parameters used in the DFT based frequency domain compression (Eq. 5) are (L, $p_\upsilon$ for $\upsilon \in \{1, 2\}$, $p_\upsilon$ for $\upsilon \in \{3, 4\}$, β, α, $N_{ph}$). The set of values for these codebook parameters are as follows.

L: the set of values is {2, 4} in general, except L∈{2, 4, 6} for rank 1-2, 32 CSI-RS antenna ports, and R=1.

$$(p_v \text{ for } v \in \{1, 2\}, p_v \text{ for } v \in \{3, 4\}) \in \left\{\left(\frac{1}{2}, \frac{1}{4}\right), \left(\frac{1}{4}, \frac{1}{4}\right), \left(\frac{1}{4}, \frac{1}{8}\right)\right\}.$$

$$\beta \in \left\{\frac{1}{4}, \frac{1}{2}, \frac{3}{4}\right\}.$$

α=2
$N_{ph}=16$.

The set of values for these codebook parameters are as in Table 1.

TABLE 1

| paramCombination | L | $p_\upsilon$ $\upsilon \in \{1, 2\}$ | $p_\upsilon$ $\upsilon \in \{3, 4\}$ | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |
| 7 | 6 | ¼ | — | ½ |
| 8 | 6 | ¼ | — | ¾ |

In Rel. 17 (further enhanced Type II port selecting codebook), M ∈ {1, 2}, $$L = \frac{K_1}{2}$$

where $K_1 = \alpha \times P_{CSIRS}$, and codebook parameters (M, α, β) are configured from Table 2.

TABLE 2

| paramCombination-r17 | M | α | β |
|---|---|---|---|
| 1 | 1 | ¾ | ½ |
| 2 | 1 | 1 | ½ |
| 3 | 1 | 1 | ¾ |
| 4 | 1 | 1 | 1 |
| 5 | 2 | ½ | ½ |
| 6 | 2 | ¾ | ½ |
| 7 | 2 | 1 | ½ |
| 8 | 2 | 1 | ¾ |

The above-mentioned framework (Eq. 5) represents the precoding-matrices for multiple ($N_3$) FD units using a linear combination (double sum) over 2L (or $K_1$) SD beams/ports and $M_\upsilon$ FD beams. This framework can also be used to represent the precoding-matrices in time domain (TD) by replacing the FD basis matrix $W_f$ with a TD basis matrix $W_t$, wherein the columns of $W_t$ comprises $M_\upsilon$ TD beams that represent some form of delays or channel tap locations. Hence, a precoder $W^l$ can be described as follows.

$$W = A_l C_l B_l^H = W_1 \tilde{W}_2 W_t^H, \quad \text{(Eq. 5A)}$$

In one example, the $M_\upsilon$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

Figure 15:
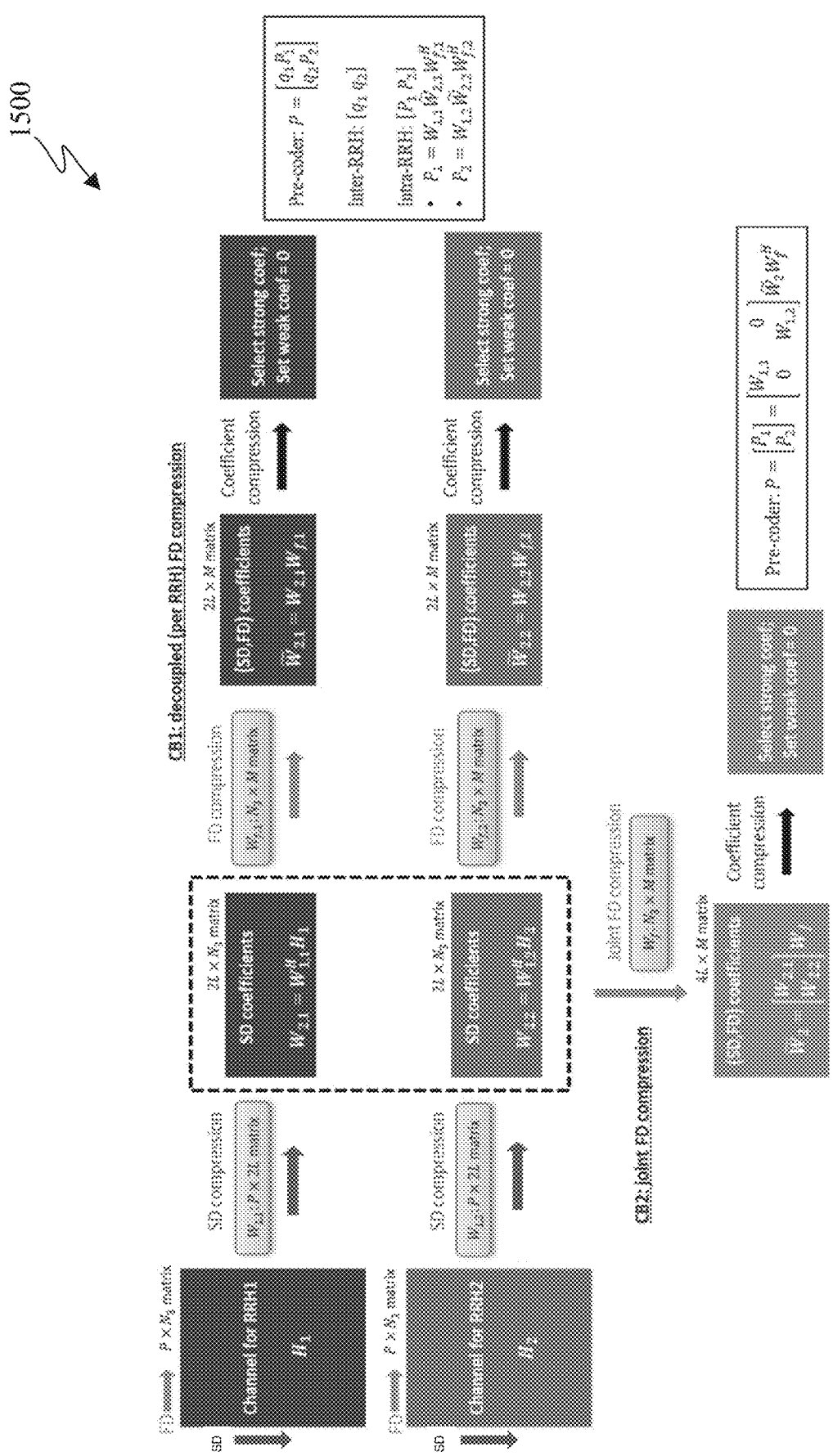
FIG. 15 illustrates two new codebooks according to embodiments of the present disclosure.

FIG. 15 illustrates an example of two new codebooks 1500 according to embodiments of the present disclosure. The embodiment of the two new codebooks 1500 illustrated in FIG. 15 is for illustration only. FIG. 15 does not limit the scope of this disclosure to any particular implementation of the two new codebooks.

In one example, the codebook for the CSI report is according to at least one of the following examples.
- In one example, the codebook can be a Rel. 15 Type I single-panel codebook (cf. 5.2.2.2.1, TS 38.214).
- In one example, the codebook can be a Rel. 15 Type I multi-panel codebook (cf. 5.2.2.2.2, TS 38.214).
- In one example, the codebook can be a Rel. 15 Type II codebook (cf. 5.2.2.2.3, TS 38.214).
- In one example, the codebook can be a Rel. 15 port selection Type II codebook (cf. 5.2.2.2.4, TS 38.214).
- In one example, the codebook can be a Rel. 16 enhanced Type II codebook (cf. 5.2.2.2.5, TS 38.214).
- In one example, the codebook can be a Rel. 16 enhanced port selection Type II codebook (cf. 5.2.2.2.6, TS 38.214).
- In one example, the codebook can be a Rel. 17 further enhanced port selection Type II codebook (cf. 5.2.2.2.7, TS 38.214).
- In one example, the codebook is a new codebook for C-JT CSI reporting.
  - a. In one example, the new codebook is a decoupled codebook comprising the following components: (called 'CB1' hereafter)
    - i. Intra-TRP: per TRP Rel. 16/17 Type II codebook components, i.e., SD basis vectors (W1), FD basis vectors (Wf), W2 components (e.g., SCI, indices of NZ coefficients, and amplitude/phase of NZ coefficients).
    - ii. Inter-TRP: co-amplitude and co-phase for each TRP.
  - b. In one example, the new codebook is a joint codebook (called 'CB2' hereafter) comprising following components
    - i. Per TRP SD basis vectors (W1)
    - ii. Single joint FD basis vectors (Wf)
    - iii. Single joint W2 components (e.g., SCI, indices of NZ coefficients, and amplitude/phase of NZ coefficients)

In one example, when the codebook is a legacy codebook (e.g., one of Rel. 15/16/17 NR codebooks, according to one of the examples above), then the CSI reporting is based on a CSI resource set comprising one or multiple NZP CSI-RS resource(s), where each NZP CSI-RS resource comprises CSI-RS antenna ports for all TRPs/RRHs, i.e., $P = \sum_{r=1}^{N} P_r$, where P is the total number of antenna ports, and $P_r$ is the number of antenna ports associated with r-th TRP. In this case, a TRP corresponds to (or maps to or is associated with) a group of antenna ports.

In one example, when the codebook is a new codebook (e.g., one of the two new codebooks described above and illustrated in FIG. 15), then the CSI reporting is based on a CSI resource set comprising one or multiple NZP CSI-RS resource(s).
- In one example, each NZP CSI-RS resource comprises CSI-RS antenna ports for all TRPs/RRHs. i.e., $P = \sum_{r=1}^{N} P_r$, where P is the total number of antenna ports, and $P_r$ is the number of antenna ports associated with the r-th TRP. In this case, a TRP corresponds to (or maps to or is associated with) a group of antenna ports.
- In one example, each NZP CSI-RS resource corresponds to (or maps to or is associated with) a TRP/RRH.

In one embodiment, a UE is configured with an mTRP (or D-MIMO) codebook, which is designed based on Rel-16/17 Type-II codebook. The mTRP codebook has a triple-stage structure which can be represented as $W = W_1 W_2 W_f^H$, where the component $W_1$ is used to report/indicate a spatial-domain (SD) basis matrix comprising SD basis vectors, the component $W_f$ is used to report/indicate a frequency-domain (FD) basis matrix comprising FD basis vectors, and the component $W_2$ is used to report/indicate coefficients corresponding to SD and FD basis vectors.

The disclosure related to beam selection described below for $W_1$ is not only for SD beam selection, (e.g., DFT basis vector selection) but also for port selection, (e.g., $v_i$ selection where $v_i$ is a vector having 1 for the i-th element and 0 elsewhere.) Port selection and beam selection can be interchangeable when appropriate.

Figure 16:
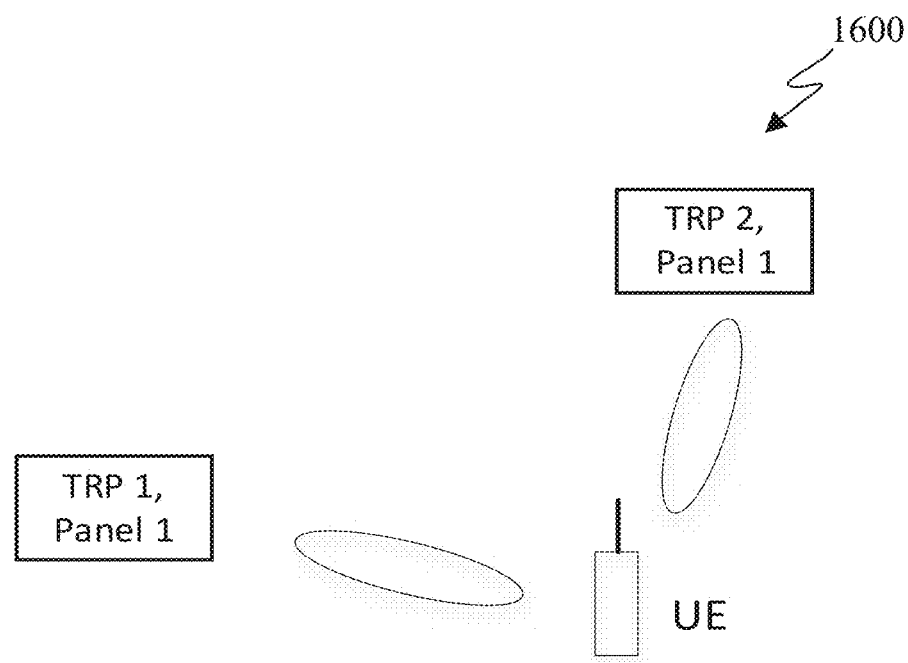
FIG. 16 illustrates an example D-MIMO where each TRP has a single antenna panel according to embodiments of the present disclosure.

FIG. 16 illustrates an example D-MIMO 1600 where each TRP has a single antenna panel according to embodiments of the present disclosure. The embodiment of the example D-MIMO 1600 where each TRP has a single antenna panel illustrated in FIG. 16 is for illustration only. FIG. 16 does not limit the scope of this disclosure to any particular implementation of the example D-MIMO where each TRP has a single antenna panel.

In one embodiment as illustrated in FIG. 16, each TRP has a single antenna panel. The component $W_1$ has a block diagonal structure comprising X diagonal blocks, where 1 (co-pol) or 2 (dual-pol) diagonal blocks are associated with each TRP.

In one example, $X = N_{TRP}$ assuming co-polarized (single polarized) antenna structure at each TRP. In one example, when $N_{TRP}=2$, the components $W_1$ is given by $$W_1 = \begin{bmatrix} B_1 & 0 \\ 0 & B_2 \end{bmatrix}$$

where $B_1$ is a basis matrix for the $1^{st}$ TRP, and $B_2$ is a basis matrix for the $2^{nd}$ TRP. In one example, $B_r = [b_{r,0}, b_{r,1}, \ldots, b_{r,L_r-1}]$ comprises $L_r$ columns or beams (or basis vectors) for r-th TRP. In one example, $L_r = L$ for all r values (TRP-common L value), for example, $L \in \{2, 3, 4, 6\}$. In one example, $L_r$ can be different across TRPs (TRP-specific L value), for example, $L_r$ can take a value (fixed or configured) from $\{2, 3, 4, 6\}$.

In one example, $X = 2N_{TRP}$ assuming dual-polarized (cross-polarized) antenna structure at each TRP.

In one example, when $N_{TRP}=2$, the components $W_1$ is given by $$W_1 = \begin{bmatrix} B_1 & 0 & 0 & 0 \\ 0 & B_1 & 0 & 0 \\ 0 & 0 & B_2 & 0 \\ 0 & 0 & 0 & B_2 \end{bmatrix}$$

where $B_1$ is a basis matrix for the $1^{st}$ TRP and is common (the same) for the two polarizations, which correspond to the first and second diagonal blocks, and $B_2$ is a basis matrix for the $2^{nd}$ TRP and is common (the same) for the two polarizations, which correspond to the third and fourth diagonal blocks. In general, (2r−1)-th and (2r)-th diagonal blocks correspond to the two antenna polarizations for the r-th TRP. In one example, $B_r = [b_{r,0}, b_{r,1}, \ldots, b_{r,L_r-1}]$ comprises $L_r$ columns or beams (or basis vectors) for r-th TRP. In one example, $L_r = L$ for all r values (TRP-common L value), for example, $L \in \{2, 3, 4, 6\}$. In one example, $L_r$ can be different across TRPs (TRP-specific L value), for example, $L_r$ can take a value (fixed or configured) from $\{2, 3, 4, 6\}$.

In one example, when $N_{TRP}=2$, the components $W_1$ is given by $$W_1 = \begin{bmatrix} B_1 & 0 & 0 & 0 \\ 0 & B_2 & 0 & 0 \\ 0 & 0 & B_1 & 0 \\ 0 & 0 & 0 & B_2 \end{bmatrix}$$

where $B_1$ is a basis matrix for the $1^{st}$ TRP and is common (the same) for the two polarizations, which correspond to the first and third diagonal blocks, and $B_2$ is a basis matrix for the $2^{nd}$ TRP and is common (the same) for the two polarizations, which correspond to the second and fourth diagonal blocks. In general, r-th and $(r+N_{TRP})$-th diagonal blocks correspond to the two antenna polarizations for the r-th TRP. In one example, $B_r = [b_{r,0}, b_{r,1}, \ldots, b_{r,L_r-1}]$ comprises $L_r$ columns or beams (or basis vectors) for r-th TRP. In one example, $L_r = L$ for all r values (TRP-common L value), for example, $L \in \{2, 3, 4, 6\}$. In one example, $L_r$ can be different across TRPs (TRP-specific L value), for example, $L_r$ can take a value (fixed or configured) from $\{2, 3, 4, 6\}$.

In one example, when $N_{TRP}=2$, the components $W_1$ is given by $$W_1 = \begin{bmatrix} B_{1,1} & 0 & 0 & 0 \\ 0 & B_{1,2} & 0 & 0 \\ 0 & 0 & B_{2,1} & 0 \\ 0 & 0 & 0 & B_{2,2} \end{bmatrix}$$

where $B_{1,1}$ and $B_{1,2}$ are basis matrices for the first and second antenna polarizations of the $1^{st}$ TRP, which correspond to the first and second diagonal blocks, and $B_{2,1}$ and $B_{2,2}$ are basis matrices for the first and second antenna polarizations of the $2^{nd}$ TRP, which correspond to the third and fourth diagonal blocks. In general, $(2r-1)$-th and $(2r)$-th diagonal blocks correspond to the two antenna polarizations for the r-th TRP. In one example, $b_{r,p}=[b_{r,p,0}, b_{r,p,1}, \ldots, b_{r,p,L_{r,p}-1}]$ comprises $L_{r,p}$ columns or beams (or basis vectors) for p-th polarization of r-th TRP. In one example, $L_{r,p}=L$ for all r and p values (TRP-common and polarization-common L value), for example $L \in \{2, 3, 4, 6\}$. In one example, $L_{r,p}=L_r$ for all p values (TRP-specific and polarization-common L value). In one example, $L_{r,p}=L_p$ for all r values (TRP-common and polarization-specific L value). In one example, $L_{r,p}$ can be different across TRPs (TRP-specific and polarization-specific L value).

In one example, when $N_{TRP}=2$, the components $W_1$ is given by $$W_1 = \begin{bmatrix} B_{1,1} & 0 & 0 & 0 \\ 0 & B_{2,1} & 0 & 0 \\ 0 & 0 & B_{1,2} & 0 \\ 0 & 0 & 0 & B_{2,2} \end{bmatrix}$$

where $B_{1,1}$ and $B_{1,2}$ are basis matrices for the first and second antenna polarizations of the $1^{st}$ TRP, which correspond to the first and third diagonal blocks, and $B_{2,1}$ and $B_{2,2}$ are basis matrices for the first and second antenna polarizations of the $2^{nd}$ TRP, which correspond to the second and fourth diagonal blocks. In general, r-th and $(r+N_{TRP})$-th diagonal blocks correspond to the two antenna polarizations for the r-th TRP. In one example, $b_{r,p}=[b_{r,p,0}, b_{r,p,1}, \ldots, b_{r,p,L_{r,p}-1}]$ comprises $L_{r,p}$ columns or beams (or basis vectors) for p-th polarization of r-th TRP. In one example, $L_{r,p}=L$ for all r and p values (TRP-common and polarization-common L value), for example $L \in \{2, 3, 4, 6\}$. In one example, $L_{r,p}=L_r$ for all p values (TRP-specific and polarization-common L value). In one example, $L_{r,p}=L_p$ for all r values (TRP-common and polarization-specific L value). In one example, $L_{r,p}$ can be different across TRPs (TRP-specific and polarization-specific L value).

In one example, $X = \sum_{r=1}^{N_{TRP}} a_r$, where $a_r=1$ for co-polarized (single polarized) antenna structure at r-th TRP, and $a_r=2$ for dual-polarized (cross-polarized) antenna structure at r-th TRP.

In one example, when $N_{TRP}=2$, the components $W_1$ is given by $$W_1 = \begin{bmatrix} B_1 & 0 & 0 \\ 0 & B_2 & 0 \\ 0 & 0 & B_2 \end{bmatrix}$$

where $B_1$ is a basis matrix for the $1^{st}$ TRP, and $B_2$ is a basis matrix for the $2^{nd}$ TRP and is common (the same) for the two polarizations, which correspond to the second and third diagonal blocks.

In one example, when $N_{TRP}=2$, the components $W_1$ is given by $$W_1 = \begin{bmatrix} B_1 & 0 & 0 \\ 0 & B_{2,1} & 0 \\ 0 & 0 & B_{2,2} \end{bmatrix}$$

where $B_1$ is a basis matrix for the $1^{st}$ TRP, and $B_{2,1}$ and $B_{2,2}$ are basis matrices for the first and second antenna polarizations of the $2^{nd}$ TRP, which correspond to the second and third diagonal blocks.

Figure 17:
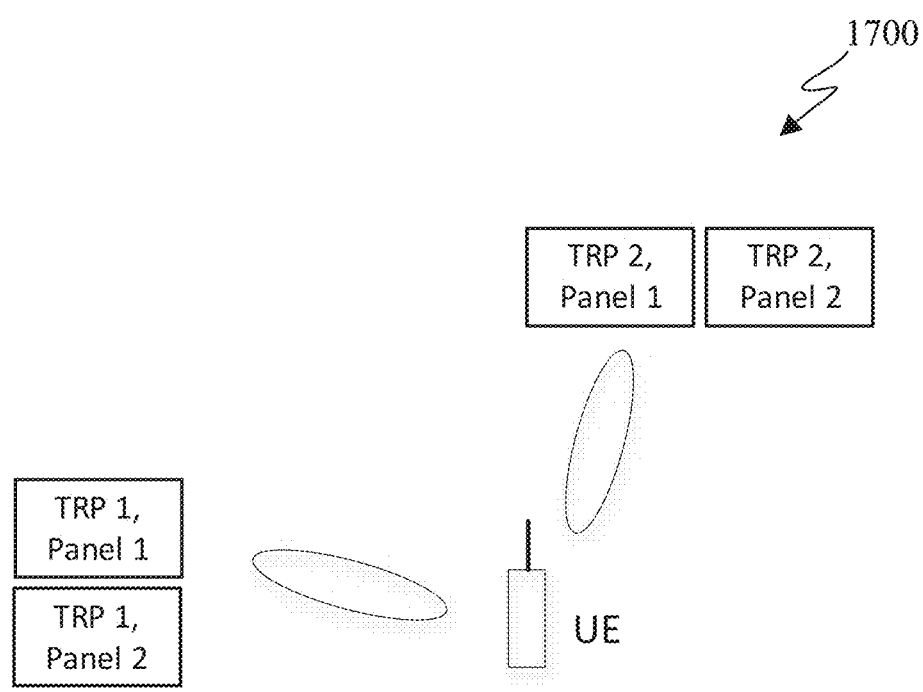
FIG. 17 illustrates an example D-MIMO where each TRP has multiple antenna panels according to embodiments of the present disclosure.

FIG. 17 illustrates an example D-MIMO where each TRP has multiple antenna panels according to embodiments of the present disclosure. The embodiment of the example D-MIMO 1700 where each TRP has a multiple antenna panels illustrated in FIG. 17 is for illustration only. FIG. 17 does not limit the scope of this disclosure to any particular implementation of the example D-MIMO where each TRP has multiple antenna panels.

As illustrated in FIG. 17, in one embodiment, each TRP has multiple antenna panels. The component $W_1$ has a block diagonal structure comprising X diagonal blocks, where $N_{g,r}$ (co-pol) or $2N_{g,r}$ (dual-pol) diagonal blocks are associated with r-th TRP comprising $N_{g,r}$ panels and $N_{g,r}>1$ for all values of r. Note $N_{g,r}=2$ for both TRPs in FIG. 17.

One or more of the examples described above can be extended in a straightforward manner in this case (of multiple panels at TRPs) by adding the diagonal blocks corresponding to multiple panels in $W_1$.

Figure 18:
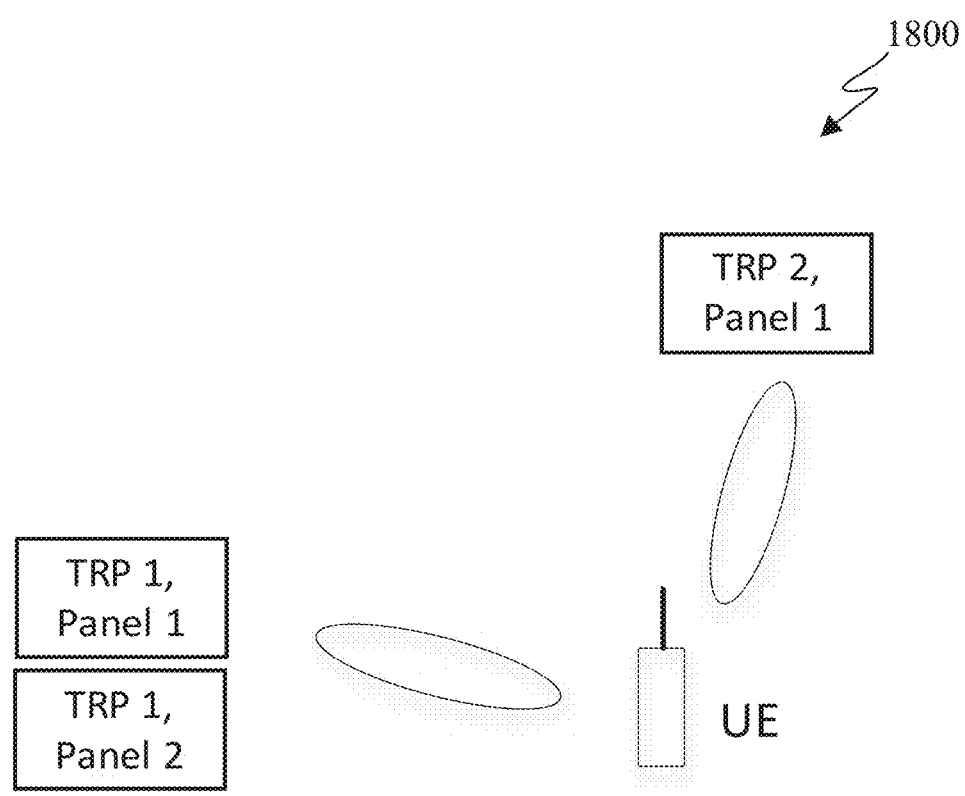
FIG. 18 illustrates an example D-MIMO where each TRP can be a single panel (SP) or multi-panel (MP) according to embodiments of the present disclosure.

FIG. 18 illustrates an example D-MIMO 1800 where each TRP can be an SP or MP according to embodiments of the present disclosure. The embodiment of the example D-MIMO 1800 where each TRP can be an SP or MP example illustrated in FIG. 18 is for illustration only. FIG. 18 does not limit the scope of this disclosure to any particular implementation of the example D-MIMO where each TRP can be an SP or MP.

As illustrated in FIG. 18, in one embodiment, each TRP can have a single antenna panel or multiple antenna panels. The component $W_1$ has a block diagonal structure comprising X diagonal blocks, where $N_{g,r}$ (co-pol) or $2N_{g,r}$ (dual-pol) diagonal blocks are associated with r-th TRP comprising $N_{g,r}$ panels, and $N_{g,r}=1$ when r-th TRP has a single panel and $N_{g,r}>1$ when r-th TRP has multiple panels.

One or more examples described above can be extended in a straightforward manner in this case (of multiple panels at TRPs) by adding the diagonal blocks corresponding to multiple panels in $W_1$.

In one embodiment, the basis matrices comprising the diagonal blocks of the component $W_1$ have columns that are selected from a set of oversampled 2D DFT vectors. When the antenna port layout is the same across TRPs, for a given antenna port layout $(N_1, N_2)$ and oversampling factors $(O_1, O_2)$ for two dimensions, a DFT vector $v_{l,m}$ can be expressed as follows.

$$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T$$

$$u_m = \left[ 1 \quad e^{j\frac{2\pi m}{O_2 N_2}} \quad \ldots \quad e^{j\frac{2\pi m(N_2-1)}{O_2 N_2}} \right]$$

where $l \in \{0, 1, \ldots, O_1 N_1 - 1\}$ and $m \in \{0, 1, \ldots, O_2 N_2 - 1\}$.

When the antenna port layout can be different across TRPs, for a given antenna port layout $(N_{1,r}, N_{2,r})$ and oversampling factors $(O_{1,r}, O_{2,r})$ associated with r-th TRP, a DFT vector can be expressed as follows.

$$v_{l_r,m_r} = \left[ u_{m_r} \quad e^{j\frac{2\pi l_r}{O_{1,r} N_{1,r}}} u_{m_r} \quad \ldots \quad e^{j\frac{2\pi l_r (N_{1,r}-1)}{O_{1,r} N_{1,r}}} u_{m_r} \right]^T$$

$$u_{m_r} = \left[ 1 \quad e^{j\frac{2\pi m_r}{O_{2,r} N_{2,r}}} \quad \ldots \quad e^{j\frac{2\pi m_r (N_{2,r}-1)}{O_{2,r} N_{2,r}}} \right]$$

where $l_r \in \{0, 1, \ldots, O_{1,r} N_{1,r} - 1\}$ and $m_r \in \{0, 1, \ldots, O_{2,r} N_{2,r} - 1\}$.

In one example, the oversampling factor is TRP-common, hence remains the same across TRPs. For example, e.g., $O_{1,r}=O_1=O_{2,r}=O_2=4$. In one example, the oversampling factor is TRP-specific, hence is independent for each TRP. For example, $O_{1,r}=O_{2,r}=x$ and x is chosen (fixed or configured) from $\{2, 4, 8\}$.

In one embodiment, the basis matrices comprising the diagonal blocks of the component $W_1$ have columns that are selected from a set of port selection vectors. When the antenna port layout is the same across TRPs, for a given number of CSI-RS port $P_{CSI-RS}$, a port selection vector $v_m$ is a $P_{CSI-RS}/2$-element column vector containing a value of 1 in element $$\left( m \bmod \frac{P_{CSI-RS}}{2} \right)$$

and zeros elsewhere (where the first element is element 0).

When the antenna port layout can be different across TRPs, for a given number of CSI-RS port $P_{CSI-RS,r}$, a port selection vector $v_{m_r}$ is a $P_{CSI-RS,r}/2$-element column vector containing a value of 1 in element $$\left( m_r \bmod \frac{P_{CSI-RS,r}}{2} \right)$$

and zeros elsewhere (where the first element is element 0).

In one embodiment, each TRP can have a single antenna panel or multiple antenna panels. The component $W_1$ has a block diagonal structure comprising X=2 diagonal blocks, where $N_{g,r}$ (co-pol) or $2N_{g,r}$ (dual-pol) diagonal blocks are associated with r-th TRP comprising $N_{g,r}$ panels, and $N_{g,r}=1$ when r-th TRP has a single panel and $N_{g,r}>1$ when r-th TRP has multiple panels.

In the following, a term polarization is used to refer to a group/subset of CSI-RS ports. For example, a first antenna polarization corresponds to a first group/subset of CSI-RS ports $$\left\{ X, X+1, \ldots, X + \frac{P_{CSIRS}}{2} + 1 \right\},$$

and a second antenna polarization corresponds to a second group/subset of CSI-RS ports $$\left\{ X + \frac{P_{CSIRS}}{2}, X + \frac{P_{CSIRS}}{2} + 1, \ldots, X + P_{CSIRS} + 1 \right\}.$$

Here, $P_{CSIRS}$ is a total number of CSI-RS ports the CSI reporting is configured for. In one example, X=3000 is the first CSI-RS port index.

In the following, a TRP can refer to a CSI-RS resource (configured for channel measurement), or a group of CSI-RS ports within a CSI-RS resource (comprising multiple groups of CSI-RS ports).

In one embodiment, the component $W_1$ is TRP-common port selection (or TRP-common SD basis beam selection), i.e., a same set of ports is selected for all TRPs.

In one example, the component $W_1$ is TRP-common, polarization common, and layer-common (i.e., the same set of CSI-RS ports is selected/reported for all TRPs, for both antenna polarizations, and for all layers). For example, the $W_1$ can be expressed as:

$$W_1^{(\ell)} = W_1 = \begin{bmatrix} B & 0 & 0 \\ 0 & \ddots & 0 \\ 0 & 0 & B \end{bmatrix}, \ell = 1, \ldots, V,$$

where V is a number of layers, $W_1^{(\ell)}$ is $W_1$ of the $\ell$-th layer, B includes a common set of port selection vectors for all TRPs, dual polarized antenna ports, and layers. In one example, when $N_{TRP}=2$, $W_1$=diag(B, B, B, B) for dual-polarized case, where diag (A, B, C, . . . ) is the block diagonal matrix composed of A, B, C, . . . matrices in the block diagonal way. In one example B=[$b_0$, $b_1$, . . . , $b_{L-1}$], where L is a number of port selection vectors. When the antenna port layout is the same across TRPs and the number of CSI-RS ports per TRP is $P_{CSI-RS}$ (i.e, $P_{CSI-RS,total}=N_{TRP}P_{CSI-RS}$), the same L ports are selected out of $$\frac{P_{CSI-RS}}{2}$$

(assuming a dual-polarized case) across TRPs and layers. In this case, an indicator with cardinality (payload)

$$\left\lceil \log_2 \left( \frac{\frac{P_{CSI-RS}}{2}}{L} \right) \right\rceil$$

bits is needed to indicate selected L ports for all layers, and this indicator is reported in CSI reporting, e.g., as a PMI component.

In one example, the component $W_1$ is TRP-common, polarization common, and layer-specific (i.e., for each layer, a same set of CSI-RS ports is selected/reported for all TRPs, and for both antenna polarizations). For example, the $W_1$ can be expressed as:

$$W_1^{(\ell)} = \begin{bmatrix} B^{(\ell)} & 0 & 0 \\ 0 & \ddots & 0 \\ 0 & 0 & B^{(\ell)} \end{bmatrix}, \ell = 1, \ldots, V,$$

where V is a number of layers, $W_1^{(\ell)}$ is $W_1$ of the $\ell$-th layer, $B^{(\ell)}$ includes a common set of port selection vectors for all TRPs and dual polarized antenna ports. In one example $B^{(\ell)} = [b_0^{(\ell)}, b_1^{(\ell)}, \cdots, b_{L-1}^{(\ell)}]$, where L is a number of port selection vectors. When the antenna port layout is the same across TRPs and the number of CSI-RS ports per TRP is $P_{CSI-RS}$ (i.e. $P_{CSI-RS,total} = N_{TRP} P_{CSI-RS}$), the same L ports are selected out of $$\frac{P_{CSI-RS}}{2}$$

(assuming a dual-polarized case) across TRPs for each layer. In this case, as an example, an indicator with cardinality (payload)

$$\left\lceil \log_2 \left( \frac{\frac{P_{CSI-RS}}{2}}{L} \right) \right\rceil$$

is needed to indicate selected L ports for each layer, and each indicator is reported in CSI reporting, e.g., as a PMI component.

In another example, L depends on layer (index $\ell$). In this case, $B^{(\ell)} = [b_0^{(\ell)}, b_1^{(\ell)}, \cdots, b_{L-1}^{(\ell)}]$, and thus, in one example, an indicator with cardinality (payload)

$$\left\lceil \log_2 \left( \frac{\frac{P_{CSI-RS}}{2}}{L_\ell} \right) \right\rceil$$

is needed to indicate selected $L_\ell$ ports for each layer $\ell$.

In one example, the component $W_1$ is TRP-common, polarization specific, and layer-common (i.e., for each polarization, a same set of CSI-RS ports is selected/reported for all TRPs and for all layers. For example, the $W_1$ can be expressed as:

$$W_1^{(\ell)} = W_1 = \begin{bmatrix} B_{0,1} & 0 & 0 & 0 & 0 \\ 0 & B_{0,2} & 0 & 0 & 0 \\ 0 & 0 & \ddots & 0 & 0 \\ 0 & 0 & 0 & B_{0,1} & 0 \\ 0 & 0 & 0 & 0 & B_{0,2} \end{bmatrix}, \ell = 1, \ldots, V,$$

where V is a number of layers, $W_1^{(\ell)}$ is $W_1$ of the $\ell$-th layer, $B_{0,k}$ includes a common set of port selection vectors for all TRPs and layers for k-th polarization (where k=1,2). In one example $B_{0,k} = [b_{0,k}, b_{1,k}, \ldots, b_{L-1,k}]$, where L is a number of port selection vectors, for k-th polarization.

When the antenna port layout is the same across TRPs and the number of CSI-RS ports per TRP is $P_{CSI-RS}$ (i.e., $P_{CSI-RS,total} = N_{TRP} P_{CSI-RS}$), the same L ports are selected out of $$\frac{P_{CSI-RS}}{2}$$

(assuming a dual-polarized case) across TRPs and layers for each opalization. In this case, as an example, an indicator with cardinality (payload)

$$\left\lceil \log_2 \left( \frac{\frac{P_{CSI-RS}}{2}}{L} \right) \right\rceil$$

is needed to indicate selected L ports for all TRPs and layers for each polarization, and each indicator is reported in CSI reporting, e.g., as a PMI component.

In another example, L depends on polarization (index k). In this case, $B_{0,k} = [b_{0,k}, b_{1,k}, \ldots, b_{L_k-1,k}]$, and thus, in one example, an indicator with cardinality (payload)

$$\left\lceil \log_2 \left( \frac{\frac{P_{CSI-RS}}{2}}{L_k} \right) \right\rceil$$

is needed to indicate selected $L_k$ ports for each polarization k.

In one example, the component $W_1$ is TRP-common, polarization-specific, and layer-specific (i.e., for each polarization, for each layer, a same set of CSI-RS ports is selected/reported for all TRPs. For example, the $W_1$ can be expressed as:

$$W_1^{(\ell)} = \begin{bmatrix} B_{0,1}^{(\ell)} & 0 & 0 & 0 & 0 \\ 0 & B_{0,2}^{(\ell)} & 0 & 0 & 0 \\ 0 & 0 & \ddots & 0 & 0 \\ 0 & 0 & 0 & B_{0,1}^{(\ell)} & 0 \\ 0 & 0 & 0 & 0 & B_{0,2}^{(\ell)} \end{bmatrix}, \ell = 1, \ldots, V,$$

where V is a number of layers, $W_1^{(\ell)}$ is $W_1$ of the $\ell$-th layer, $B_{0,k}^{(\ell)}$ includes a common set of port selection vectors for all TRPs for each layer for k-th polarization (where k=1, 2). In one example $B_{0,k}^{(\ell)} = [b_{0,k}^{(\ell)}, b_{1,k}^{(\ell)}, \cdots, b_{L-1,k}^{(\ell)}]$, where L is a number of port selection vectors for layer $\ell$ for k-th polarization.

When the antenna port layout is the same across TRPs and the number of CSI-RS ports per TRP is $P_{CSI-RS}$ (i.e., $P_{CSI-RS,total} = N_{TRP} P_{CSI-RS}$), the same L ports are selected out of $$\frac{P_{CSI-RS}}{2}$$

(assuming a dual-polarized case) across TRPs for each layer for each polarization. In this case, as an example, an indicator with cardinality (payload)

$$\left\lceil \log_2 \binom{\frac{P_{CSI-RS}}{2}}{L} \right\rceil$$

is needed to indicate selected L ports for all TRPs for each layer for each polarization, and each indicator is reported in CSI reporting, e.g., as a PMI component.

In another example, L depends on polarization k and/or layer $\ell$. In one example, $\boldsymbol{B}_{0,k}^{(\ell)} = [\boldsymbol{b}_{0,k}^{(\ell)}, \boldsymbol{b}_{1,k}^{(\ell)}, \cdots, \boldsymbol{b}_{L-1,k}^{(\ell)}]$, and thus, in one example, an indicator with cardinality (payload)

$$\left\lceil \log_2 \binom{\frac{P_{CSI-RS}}{2}}{L_k} \right\rceil$$

is needed to indicate selected $L_k$ ports for each polarization k. In another example, $\boldsymbol{B}_{0,k}^{(\ell)} = [\boldsymbol{b}_{0,k}^{(\ell)}, \boldsymbol{b}_{1,k}^{(\ell)}, \cdots, \boldsymbol{b}_{L-1,k}^{(\ell)}]$, and thus, in one example, an indicator with cardinality (payload)

$$\left\lceil \log_2 \binom{\frac{P_{CSI-RS}}{2}}{L_\ell} \right\rceil$$

is needed to indicate selected $L_\ell$ ports for each layer $\ell$. In another example, $\boldsymbol{B}_{0,k}^{(\ell)} = [\boldsymbol{b}_{0,k}^{(\ell)}, \boldsymbol{b}_{1,k}^{(\ell)}, \cdots, \boldsymbol{b}_{L-1,k}^{(\ell)}]$, and thus, in one example, an indicator with cardinality (payload)

$$\left\lceil \log_2 \binom{\frac{P_{CSI-RS}}{2}}{L_{\ell(k)}} \right\rceil$$

is needed to indicate selected $L_{\ell(k)}$ ports for each layer $\ell$ for each polarization k.

In one embodiment, the component $W_1$ is TRP-specific port selection (or TRP-specific SD basis beam selection), i.e., an independent set of ports is selected/reported for each TRP.

In the present disclosure, TRP index i can be determined based on CSI-RS port number, CSI-RS resource IDs. In another example, TRP index i can be determined based on RSRP/RSRQ/SINR (which can be, e.g., based on UE measurement), and can be configured by NW or reported by UE.

In one example, the component $W_1$ is TRP-specific, polarization common, and layer-common (i.e., for each TRP, a common set of CSI-RS ports is selected/reported for all layers, and for both antenna polarizations). For example, the $W_1$ can be expressed as:

$$W_1^{(\ell)} = W_1 = \begin{bmatrix} B_1 & 0 & 0 & 0 & 0 \\ 0 & B_1 & 0 & 0 & 0 \\ 0 & 0 & \ddots & 0 & 0 \\ 0 & 0 & 0 & B_{N_{TRP}} & 0 \\ 0 & 0 & 0 & 0 & B_{N_{TRP}} \end{bmatrix}, \ell = 1, \ldots, V,$$

where V is a number of layers, $W_1^{(\ell)}$ is $W_1$ of the $\ell$-th layer, $B_i$ includes an independent set of port selection vectors for TRP i but the set is the same across polarizations and layers. In one example, when $N_{TRP}=2$, $W_1=\text{diag}(B_1, B_1, B_2, B_2)$ for dual-polarized case, where diag (A, B, C, . . . ) is the block diagonal matrix composed of A, B, C, matrices in the block diagonal way. In one example $B_i=[b_{i,0}, b_{i,1}, \ldots, b_{i,L-1}]$, where L is a number of port selection vectors for TRP i. When the antenna port layout is the same across TRPs and the number of CSI-RS ports per TRP is $P_{CSI-RS}$ (i.e., $P_{CSI-RS,total} = N_{TRP} P_{CSI-RS}$) the same L ports are selected out of $$\frac{P_{CSI-RS}}{2}$$

(assuming a dual-polarized case) across polarizations and layers. In this case, an indicator with cardinality (payload)

$$\left\lceil \log_2 \binom{\frac{P_{CSI-RS}}{2}}{L} \right\rceil$$

is needed to indicate selected L ports for all layers and polarizations for each TRP, and each indicator is reported in CSI reporting. In another example, L depends on TRP.

The reporting of the (indices) of the port selection vectors for all TRPs can be via one joint indicator, or via multiple (separate) indicators, one for each TRP.

In one example, $B_i$ includes $L_i$ port selection vectors (TRP-specific the number of port selection vectors), i.e., $B_i=[b_{i,0}, b_{i,1}, \ldots, b_{i,L_i-1}]$, where $L_i$ is a number of port selection vectors for TRP i. In one example, $L_1=2$, $L_2=4$, and so on.

In one example, $L_i$s are selected from a same set of $\mathcal{L}$. For example, $\mathcal{L}=\{1, 2\}$, $\mathcal{L}=\{1, 2, 3\}$, or $\mathcal{L}=\{1, 2, 3, 4\}$.

In one example, $L_i$ for each TRP i is selected from a corresponding set of $\mathcal{L}_i$. For example, $\mathcal{L}_1=\{1, 2, 3, 4\}$, $\mathcal{L}_2=\{1, 2\}$, and so on.

In another example, $(L_1, \ldots, L_{N_{TRP}})$ are selected from a set $\mathcal{L}_{joint}$ for joint indicator. For example, when $N_{TRP}=2$, $\mathcal{L}_{joint}=\{(2, 2), (2, 3), (2, 4), (3, 4)\}$.

In one example, Lis are configured by NW via RRC, MAC-CE, and/or DCI. In one example, some of $L_i$s are configured, and the others are fixed or determined based on configured values. In one example, a UE determines and reports $L_1$ and/or $L_2$, and so on.

In one example, $B_1$ and $B_2$ include $L_1$ port selection vectors and $B_3$ and $B_4$ include $L_2$ port selection vectors (TRP-pair-specific the number of port selection vectors), i.e., $B_i=[b_{i,0}, b_{i,1}, \ldots, b_{i,L_1-1}]$ for $i \in \{1, 2\}$ and $B_i=[b_{i,0}, b_{i,1}, \ldots, b_{i,L_2-1}]$ for $i \in \{3, 4\}$. In one example, $(L_1, L_2)=(4, 2)$, In one example, $L_1$ and $L_2$ are selected from a same set of $\mathcal{L}$. For example, $\mathcal{L}=\{1, 2\}$, $\mathcal{L}=\{1, 2, 3\}$, or $\mathcal{L}=\{1, 2, 3, 4\}$.

In one example, $L_i$ is selected from a corresponding set of $\mathcal{L}_i$. For example, $\mathcal{L}_1=\{1, 2, 3, 4\}$, $\mathcal{L}_2=\{1, 2\}$.

In another example, $(L_1, L_2)$ are selected from a set $\mathcal{L}_{joint}$ for joint indicator. For example, $\mathcal{L}_{joint}=\{(2, 2), (2, 3), (2, 4), (3, 4)\}$.

In one example, $L_i$s are configured by NW via RRC, MAC-CE, and/or DCI. In one example, one of $L_i$s are configured and the other is fixed or determined based on configured values. In one example, a UE determines and reports $L_1$ and/or $L_2$.

In one example, when $N_{TRP} \leq x$, one L value is used for all TRPs, and when $N_{TRP} > x$, two L values are used, where x is a threshold value, which can be fixed e.g., 2 or configured.

For example, if x is fixed to 2, we can have
$B_i=[b_{i,0}, b_{i,1}, \ldots, b_{i,L-1}]$ for i=1, 2 when $N_{TRP}=2$.
$B_i=[b_{i,0}, b_{i,1}, \ldots, b_{i,L_1-1}]$ for i=1, 2, $B_i=[b_{i,0}, b_{i,1}, \ldots, b_{i,L_2-1}]$ for i=3, 4, when $N_{TRP}=3$ or 4.

In one example, $(L_1, L_2)=(2, 4), (3, 4)$, or another pair value.

In one example, $L_1$ and $L_2$ are selected from a same set of $\mathcal{L}$. For example, $\mathcal{L}=\{1, 2\}$, $\mathcal{L}=\{1, 2, 3\}$, or $\mathcal{L}=\{1, 2, 3, 4\}$.

In one example, $L_i$ is selected from a corresponding set of $\mathcal{L}_i$. For example, $\mathcal{L}_1=\{1, 2, 3, 4\}$, $\mathcal{L}_2=\{1, 2\}$.

In another example, $(L_i, L_2)$ are selected from a set $\mathcal{L}'$ for joint indicator. For example, $\mathcal{L}'=\{(2, 2), (2, 3), (2, 4), (3, 4)\}$.

In one example, $L_i$s are configured by NW via RRC, MAC-CE, and/or DCI. In one example, one of $L_i$s are configured and the other is fixed or determined based on configured values. In one example, a UE determines and reports $L_1$ and/or $L_2$.

In one example, a total number of port selection vectors for all TRPs is $L_{sum}$.

In one example, $L_{sum}$ is configured by NW via RRC, MAC-CE, and/or DCI. In another example, $L_{sum}$ is fixed, e.g., $L_{sum}=4$. In one example, $L_{sum}$ is determined by UE and reported.

In one example, $L_{sum}$ is selected from a set $\mathcal{L}_{sum}$, e.g., $\mathcal{L}_{sum}=\{4, 5, 6, 7\}$.

In one example, when $N_{TRP} \leq x$, $L_{sum}$ is a first value, and when $N_{TRP} > x$, $L_{sum}$ is a second value, where x is a threshold value, which can be fixed e.g., 2 or configured. In one example, (the first value, the second value) are configured or fixed.

In one example, $L_i$ value is layer-common and rank-common.

In one example, L' value is layer-common and rank-common.

In one example, $L_i$ value is layer-specific and rank-common.

In one example, L' value is layer-specific and rank-common.

In one example, $L_i$ value is layer-common and rank-specific.

In one example, L' value is layer-common and rank-specific.

In one example, $L_i$ value is layer-specific and rank-specific.

In one example, L' value is layer-specific and rank-specific.

In the above examples, TRP index i can be determined based on CSI-RS port number, CSI-RS resource IDs. In another example, TRP index i can be determined based on RSRP/RSRQ/SINR (which can be, e.g., based on UE measurement), and can be configured by NW or reported by UE.

In one example, the component $W_1$ is TRP-specific, polarization common, and layer-specific (i.e., for each TRP and for each layer, a common set of CSI-RS ports is selected/reported for both antenna polarizations). For example, the $W_1$ can be expressed as:

$$W_1^{(\ell)} = \begin{bmatrix} B_1^{(\ell)} & 0 & 0 & 0 & 0 \\ 0 & B_1^{(\ell)} & 0 & 0 & 0 \\ 0 & 0 & \ddots & 0 & 0 \\ 0 & 0 & 0 & B_{N_{TRP}}^{(\ell)} & 0 \\ 0 & 0 & 0 & 0 & B_{N_{TRP}}^{(\ell)} \end{bmatrix}, \ell = 1, \ldots, V,$$

where V is a number of layers, $W_1^{(\ell)}$ is $W_1$ of the $\ell$-th layer, $B_i^{(\ell)}$ includes an independent set of port selection vectors for TRP i for layer $\ell$ but the set is the same across polarizations. In one example $B_i=[b_{i,0}^{(\ell)}, b_{i,1}^{(\ell)}, \ldots, b_{i,L-1}^{(\ell)}]$, where L is a number of port selection vectors for TRP i for layer $\ell$. When the antenna port layout is the same across TRPs and the number of CSI-RS ports per TRP is $P_{CSI-RS}$ (i.e., $P_{CSI-RS,total}=N_{TRP}P_{CSI-RS}$) the same L ports are selected out of $$\frac{P_{CSI-RS}}{2}$$

(assuming a dual-polarized case) across polarizations. In this case, an indicator with cardinality (payload)

$$\left\lceil \log_2 \binom{\frac{P_{CSI-RS}}{2}}{L} \right\rceil$$

is needed to indicate selected L ports for all polarizations for each TRP i for each layer $\ell$, and each indicator is reported in CSI reporting. In another example, L depends on TRP and/or layer.

In one or more examples, L and relevant parameters can be extended according to one or more examples described above.

In one example, the component $W_1$ is TRP-specific, polarization-specific, and layer-common (i.e., for each TRP and for each polarization, a common set of CSI-RS ports is selected/reported for all layers). For example, the $W_1$ can be expressed as:

$$W_1^{(\ell)} = W_1 = \begin{bmatrix} B_{1,1} & 0 & 0 & 0 & 0 \\ 0 & B_{1,2} & 0 & 0 & 0 \\ 0 & 0 & \ddots & 0 & 0 \\ 0 & 0 & 0 & B_{N_{TRP},1} & 0 \\ 0 & 0 & 0 & 0 & B_{N_{TRP},2} \end{bmatrix}, \ell = 1, \ldots, V,$$

where V is a number of layers, $W_1^{(\ell)}$ is $W_1$ of the $\ell$-th layer, $B_{i,k}$ includes an independent set of port selection vectors for TRP i for polarization k but the set is the same across layers. In one example $B_{i,k}=[b_{i,0,k}, b_{i,1,k}, \ldots, b_{i,L-1,k}]$, where L is a number of port selection vectors for TRP i for polarization k. When the antenna port layout is the same across TRPs and the number of CSI-RS ports per TRP is $P_{CSI-RS}$ (i.e., $P_{CSI-RS,total}=N_{TRP}P_{CSI-RS}$) the same L ports are selected out of $$\frac{P_{CSI-RS}}{2}$$

(assuming a dual-polarized case) across layers. In this case, an indicator with cardinality (payload)

$$\left\lceil \log_2\left(\frac{\frac{P_{CSI-RS}}{2}}{L}\right)\right\rceil$$

is needed to indicate selected L ports for all layers for each TRP i for each polarization k, and each indicator is reported in CSI reporting. In another example, L depends on TRP and/or polarization.

In one or more examples, L and relevant parameters can be extended according to one or more examples described above.

In one example, the component $W_1$ is TRP-specific, polarization-specific, and layer-specific (i.e., for each TRP, for each polarization, and for each layer, a set of CSI-RS ports is selected/reported). For example, the $W_1$ can be expressed as:

$$W_1^{(\ell)} = \begin{bmatrix} B_{1,1}^{(\ell)} & 0 & 0 & 0 & 0 \\ 0 & B_{1,2}^{(\ell)} & 0 & 0 & 0 \\ 0 & 0 & \ddots & 0 & 0 \\ 0 & 0 & 0 & B_{N_{TRP},1}^{(\ell)} & 0 \\ 0 & 0 & 0 & 0 & B_{N_{TRP},2}^{(\ell)} \end{bmatrix}, \ell=1,\ldots,V,$$

where V is a number of layers, $W_1^{(\ell)}$ is $W_1$ of the $\ell$-th layer, $B_{i,k}^{(\ell)}$ includes an independent set of port selection vectors for TRP i for polarization k for layer $\ell$. In one example $B_{i,k}^{(\ell)}=[b_{i,0,k}^{(\ell)}, b_{i,1,k}^{(\ell)}, \ldots, b_{i,L-1,k}^{(\ell)}]$, where L is a number of port selection vectors for TRP i for polarization k for layer $\ell$. When the antenna port layout is the same across TRPs and the number of CSI-RS ports per TRP is $P_{CSI-RS}$ (i.e, $P_{CSI-RS,total}=N_{TRP}P_{CSI-RS}$) L ports are independently selected out of $$\frac{P_{CSI-RS}}{2}$$

(assuming a dual-polarized case) for TRP/polarization/layer. In this case, an indicator with cardinality (payload)

$$\left\lceil \log_2\left(\frac{\frac{P_{CSI-RS}}{2}}{L}\right)\right\rceil$$

is needed to indicate selected L ports for each TRP i for each polarization k for each layer $\ell$, and each indicator is reported in CSI reporting. In another example, L depends on TRP, polarization, and/or layer.

In one or more examples, L and relevant parameters can be extended according to one or more examples described above.

In one embodiment, the component $W_1$ is TRP-specific port selection (or TRP-specific SD basis beam selection) under a constraint that a total number of selected ports is $L_{sum}$. In this embodiment, under the constraint that a total number of selected ports is $L_{sum}$, $B_i$ includes $L_i$ port selection vectors for TRP i, where $L_{sum}=\Sigma_i L_i$.

In one example, $L_{sum}$ is configured by NW via RRC, MAC-CE, and/or DCI. In another example, $L_{sum}$ is fixed, e.g., $L_{sum}=4$. In one example, $L_{sum}$ is determined by UE and reported.

In one example, $L_{sum}$ is selected from a set $\mathcal{L}_{sum}$, e.g., $\mathcal{L}_{sum}=\{4, 5, 6, 7\}$.

In one example, when $N_{TRP}\leq x$, is a first value, and when $N_{TRP}>x$, $L_{sum}$ is a second value, where x is a threshold value, which can be fixed e.g., 2 or configured. In one example, (the first value, the second value) are configured or fixed.

In one example, the component $W_1$ is TRP-specific, polarization-common, and layer-common.

In one example, the component $W_1$ is TRP-specific, polarization-common, and layer-specific. In this case, can depend on layer $\ell$, e.g., $L_{sum}(\ell)$. In another example, $L_{sum}$ is fixed for all layers.

In one example, the component $W_1$ is TRP-specific, polarization-specific, and layer-common. $L_{sum}$ can depend on polarization k, e.g., $L_{sum}(k)$. In another example, $L_{sum}$ is fixed for all polarizations.

In one example, the component $W_1$ is TRP-specific, polarization-specific, and layer-specific. $L_{sum}$ can depend on layer $\ell$ and/or polarization k, e.g., $L_{sum}(\ell, k)$. In another example, $L_{sum}$ is fixed for all layers and polarizations.

In one embodiment, the component $W_1$ is TRP-pair common port selection (or TRP-pair common SD basis beam selection), i.e., a same set of ports is selected for each TRP pair.

In one example, the component $W_1$ is TRP-pair common, polarization-common, and layer-common. For example, when $N_{TRP}=4$, two TRP pairs exist. In this case, the $W_1$ can be expressed as $W_1^{(\ell)}=W_1=B_{12}, B_{12}, B_{12}, B_{12}, B_{34}, B_{34}, B_{34}, B_{34}$), where $B_{12}=[b_{12,0}, \ldots, b_{12,L-1}]$ and $B_{34}=[b_{34,0}, \ldots b_{34,L-1}]$ are port selection vectors for TRP pairs (i.e., TRPs 1 and 2, TRPs 3 and 4), respectively. In this case, an indicator with cardinality $$\left\lceil \log_2\left(\frac{\frac{P_{CSI-RS}}{2}}{L}\right)\right\rceil$$

is needed to indicate selected L ports for each TRP pair, and each indicator is used in CSI reporting.

In one example, the component $W_1$ is TRP-pair common, polarization-common, and layer-specific.

In one example, the component $W_1$ is TRP-pair common, polarization-specific, and layer-common.

In one example, the component $W_1$ is TRP-pair common, polarization-specific, and layer-specific.

In one embodiment, the component $W_1$ includes port selection vectors for a subset of the TRPs.

In one embodiment, for the subset of the TRPs, the component $W_1$ is TRP-common port selection (or TRP-common SD basis beam selection), i.e., a same set of ports is selected for all TRPs.

In one example, the component $W_1$ is TRP-common, polarization-common, and layer-common.

In one example, the component $W_1$ is TRP-common, polarization-common, and layer-specific.

In one example, the component $W_1$ is TRP-common, polarization-specific, and layer-common.

In one example, the component $W_1$ is TRP-common, polarization-specific, and layer-specific.

In one embodiment, for the subset of the TRPs, the component $W_1$ is TRP-specific port selection (or TRP-specific SD basis beam selection), i.e., an independent set of ports is selected for each TRP.

In one example, the component $W_1$ is TRP-specific, polarization-common, and layer-common.

In one example, the component $W_1$ is TRP-specific, polarization-common, and layer-specific.

In one example, the component $W_1$ is TRP-specific, polarization-specific, and layer-common.

In one example, the component $W_1$ is TRP-specific, polarization-specific, and layer-specific.

Similar to Rel-17 Type-II port-selection codebook, the number L of selected ports can be parameterized by a with the number of CSI-RS ports. For example, $L=K_1/2$ and $K_1=\alpha P_{CSIRS}$, where $\alpha$ takes a value from $\{1/4, 1/2, 3/4, 1\}$.

In one embodiment, the component $W_f$ is according to at least one of the following examples.

In one example, the component $W_f$ is TRP-common and layer-common, i.e., one common $W_f$ is reported for all TRPs and for all layers (when number of layers or rank>1).

In one example, the component $W_f$ is TRP-common and layer-specific, i.e., for each layer $l \in \{1, \ldots, \upsilon\}$, where $\upsilon$ is a rank value or number of layers, one common $W_f$ is reported for all TRPs.

In one example, the component $W_f$ is TRP-specific and layer-common, i.e., for each TRP $r \in \{1, \ldots, N_{TRP}\}$, one common $W_f$ is reported for all layers.

In one example, the component $W_f$ is TRP-specific and layer-specific, i.e., for each TRP $r \in \{1, \ldots, N_{TRP}\}$ and for each layer $l \in \{1, \ldots, \upsilon\}$, one $W_f$ is reported.

In one example, the component $W_f$ is TRP-pair-common and layer-common, i.e., one common $W_f$ is reported for each TRP pair and for all layers (when number of layers or rank>1).

In one example, the component $W_f$ is TRP-pair-common and layer-specific, i.e., for each layer $l \in \{1, \ldots, \upsilon\}$, where $\upsilon$ is a rank value or number of layers, one common $W_f$ is reported for each TRP pair.

In one embodiment, let $W_f$ comprise $M_\upsilon$ columns for a given rank value v. The value of $M_\upsilon$ can be fixed (e.g., 1 or 2), or configured via higher layer (RRC) signaling (similar to R16 enhanced Type II codebook) or reported by the UE as part of the CSI report). The value of $M_\upsilon$ and some other parameters (e.g., $\alpha$, $\beta$ as Rel-17 Type-II CB) can be jointly parameterized and the joint parameter can be configured by NW. The value of $M_\upsilon$ is according to at least one of the following examples. In one example, $M_\upsilon \in \{1, 2\}$ when $W_1$ comprises port selection vectors, i.e., when the UE is configured with a port selection Type II codebook, as described in this disclosure. In one example, $$M_v = \left\lceil \frac{p_v N_3}{R} \right\rceil$$

when $W_1$ comprises DFT basis vectors, i.e., when the UE is configured with a regular Type II codebook, as described in this disclosure, and as in section 5.2.2.2.5 TS 38.214.

In one example, the value of $M_\upsilon$ is TRP-common, layer-common, and RI-common. The same $M_\upsilon$ value is used common for all values of $N_{TRP}$, $\upsilon$, and layers=$1, \ldots, \upsilon$.

In one example, the value of $M_\upsilon$ is TRP-common, layer-common, and RI-specific. For each RI value $\upsilon$, the same $M_\upsilon$ value is used common for all values of $N_{TRP}$ and layers=$1, \ldots, \upsilon$.

In one example, the value of $M_\upsilon$ is TRP-common, layer-specific, and RI-common. For each layers=$1, \ldots, \upsilon$, the same $M_\upsilon$ value is used common for all values of $N_{TRP}$ and $\upsilon$.

In one example, the value of $M_\upsilon$ is TRP-specific, layer-common, and RI-common. For each TRP $r \in \{1, \ldots, N_{TRP}\}$, the same $M_\upsilon$ value is used common for all values of v and layers=$1, \ldots, \upsilon$.

In one example, the value of $M_\upsilon$ is TRP-common, layer-specific, and RI-specific.

In one example, the value of $M_\upsilon$ is TRP-specific, layer-specific, and RI-common.

In one example, the value of $M_\upsilon$ is TRP-specific, layer-common, and RI-specific.

In one example, the value of $M_\upsilon$ is TRP-specific, layer-specific, and RI-specific.

In one example, the value of $M_\upsilon$ is TRP-pair-common, layer-common, and RI-common.

In one example, the value of $M_\upsilon$ is TRP-pair-common, layer-common, and RI-specific.

In one example, the value of $M_\upsilon$ is TRP-pair-common, layer-specific, and RI-common.

In one example, the value of $M_\upsilon$ is TRP-pair-common, layer-specific, and RI-specific.

In one embodiment, the columns of $W_f$ are selected from a set of oversampled DFT vectors. When the antenna port layout is the same across TRPs, for a given $N_3$ and oversampling factors $O_3$, a DFT vector $y_f$ can be expressed as follows.

$$y_f = \begin{bmatrix} 1 & e^{j\frac{2\pi f}{O_3 N_3}} & \ldots & e^{j\frac{2\pi f(N_3-1)}{O_3 N_3}} \end{bmatrix}$$

where $f \in \{0, 1, \ldots, O_3 N_3 - 1\}$.

When $N_3$ value can be different across TRPs, for r-th TRP, a DFT vector $y_{f_r}$ can be expressed as follows.

$$y_{f_r} = \begin{bmatrix} 1 & e^{j\frac{2\pi f_r}{O_{3,r} N_{3,r}}} & \ldots & e^{j\frac{2\pi f_r(N_3-1)}{O_{3,r} N_{3,r}}} \end{bmatrix}$$

where $f_r \in \{0, 1, \ldots, O_3 N_{3,r} - 1\}$.

In one example, the oversampling factor is TRP-common, hence remains the same across TRPs. For example, e.g., $O_{3,r}=O_3$. In one example, the oversampling factor is TRP-specific, hence is independent for each TRP. For example, $O_{3,r}=x$ and x is chosen (fixed or configured) from $\{1, 2, 4, 8\}$. In one example, the oversampling factor=1. Then, the DFT vector $y_f$ can be expressed as follows.

$$y_f = \begin{bmatrix} 1 & e^{j\frac{2\pi f}{N_3}} & \ldots & e^{j\frac{2\pi f(N_3-1)}{N_3}} \end{bmatrix}.$$

In one embodiment, the columns of $W_f$ are selected from a set of port selection vectors. When $N_3$ value is the same across TRPs, for a given $N_3$ value, a port selection vector $v_m$ is a $N_3$-element column vector containing a value of 1 in element (m mod $N_3$) and zeros elsewhere (where the first element is element 0).

When the $N_3$ value can be different across TRPs, for a given $N_{3,r}$ value, a port selection vector $v_{m_r}$ is a $N_3$-element column vector containing a value of 1 in element ($m_r$ mod $N_3$) and zeros elsewhere (where the first element is element 0).

In one embodiment, the FD bases (or FD basis vectors) used for $W_f$ quantitation are limited within a single window/set with size N configured to the UE.

In one example, FD bases (or FD basis vectors) in the window are consecutive from an orthogonal DFT matrix.

In one example, FD bases (or FD basis vectors) in the set can be consecutive/non-consecutive, and are selected freely by NW from an orthogonal DFT matrix.

In one embodiment, a UE is configured with an mTRP (or D-MIMO or C-JT) codebook, via e.g., higher layer parameter codebookType set to 'typeII-r18-cjt', which is designed based on Rel-16/17 Type-II codebook. For example, The mTRP codebook has a triple-stage structure which can be represented as $W=W_1 W_2 W_f^H$, where the component $W_1$ is used to report/indicate a spatial-domain (SD) basis matrix comprising SD basis vectors, the component $W_f$ is used to report/indicate a frequency-domain (FD) basis matrix comprising FD basis vectors, and the component $W_2$ is used to report/indicate coefficients corresponding to SD and FD basis vectors.

In one example, in Rel-16 Type-II codebook, L vectors, $$v_{m_1^{(i)},m_2^{(i)}},$$

i=0, 1, . . . , L−1, are identified by the indices $q_1$, $q_2$, $n_1$, $n_2$, indicated by $i_{1,1}$, $i_{1,2}$, obtained as in 5.2.2.2.3, where the values of C(x, y) are given in Table 5.2.2.2.5-4 of [9].

In Rel-18 Type-II codebook for multi-TRP, $L_n$ SD basis vectors for each TRP n can be selected/reported, where we denote that $L_n$ is a number of SD basis vectors for TRP n (CSI-RS resource n).

In one embodiment, on the SD basis selection for (Rel-18) Type-II codebook refinement for CJT mTRP, each of the $\{L_n, n=1, \ldots, N_{TRP}\}$ is configured by NW via higher-layer (RRC) signaling, where $N_{TRP}$ is a number of TRPs configured by the NW.

In one example, $L_n \in \{2, 4, 6\}$. In one example, $L_n \in \{1, 2, 4, 6\}$. In one example, $L_n \in \{1, 2, 3, 4, 5, 6\}$. In one example, In one example, $L_n \in \{1, 2, 3, 4\}$. In one example, $L_n \in \{1, 2, 3\}$. In one example, $L_n \in \{1, 2, 4\}$. In one example, $L_n$ can be selected from $\mathcal{L}_n$, where $\mathcal{L}_n$ is a subset of $\{1, 2, 3, 4, 5, 6\}$.

In one embodiment, on the SD basis selection for (Rel-18) Type-II codebook refinement for CJT mTRP, $L_{tot}=\Sigma_{n=1}^{N_{TRP}} L_n$ is configured by NW via higher-layer (RRC) signaling and the relative value(s) of $\{L_n, n=1, \ldots, N_{TRP}\}$ are reported by the UE, where $N_{TRP}$ is a number of TRPs configured by the NW. Although we denote $L_{tot}$ for $\Sigma_{n=1}^{N_{TRP}} L_n$, another notation can be used for $L_{tot}$, such as $L_{sum}$ (e.g., as in embodiment 0.9), L', $\overline{L}$, etc. In one example, $N_{TRP} \in \{1, 2, 3, 4\}$.

In one example, $L_{tot} \in \{2N_{TRP}, 4N_{TRP}, 6N_{TRP}\}$. In one example, $L_{tot} \in \{1N_{TRP}, 2N_{TRP}, 4N_{TRP}, 6N_{TRP}\}$. In one example, $L_{tot} \in \{1N_{TRP}, 2N_{TRP}, 3N_{TRP}, 4N_{TRP}, 5N_{TRP}, 6N_{TRP}\}$. In one example, In one example, $L_{tot} \in \{1N_{TRP}, 2N_{TRP}, 3N_{TRP}, 4N_{TRP}\}$. In one example, $L_{tot} \in \{1N_{TRP}, 2N_{TRP}, 3N_{TRP}\}$.

In one example, $L_{tot} \in \{1N_{TRP}, 2N_{TRP}, 4N_{TRP}\}$. In one example, $L_{tot}$ can be selected from $\mathcal{L}_{tot}$, where $\mathcal{L}_{tot}$ is a subset of $\{1, \ldots, 24\}$.

In one example, $L_{tot} \in \mathcal{L}_{tot,1}$ for $N_{TRP} \geq x$ and $L_{tot} \in \mathcal{L}_{tot,2}$ for $N_{TRP} < x$, where $\mathcal{L}_{tot,1}$ and $\mathcal{L}_{tot,2}$ is a subset of $\{1, \ldots, 24\}$ and x=1, 2, 3, or 4.

In one example, $L_{tot} \in \mathcal{L}_{tot,1}$ for $N_{TRP} > x$ and $L_{tot} \in \mathcal{L}_{tot,2}$ for $N_{TRP} \leq x$, where $\mathcal{L}_{tot,1}$ and $\mathcal{L}_{tot,2}$ is a subset of $\{1, \ldots, 24\}$ and x=1, 2, 3, or 4.

In one example, $\{L_n, n=1, \ldots, N_{TRP}\}$ are explicitly reported via a joint indicator or separate multiple indicators in CSI part 1. For example, a joint indicator can be used to indicate $(L_1, \ldots, L_{N_{TRP}})$ under the constraint of $L_{tot}=\Sigma_{n=1}^{N_{TRP}} L_n$ and $L_n \geq 0$, for n=1, . . . , $N_{TRP}$ where $L_n$ is a non-negative integer. In another example, an indicator can be used to indicate each $L_n$ for n=1, . . . , $N_{TRP}$ under the constraint of $L_{tot}=\Sigma_{n=1}^{N_{TRP}} L_n$ and $L_n \geq 0$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of ($N_1$, $N_2$) configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.

In one example, a joint indicator to indicate $\{L_n\}$ SD basis vectors has the payload of $$\left\lceil \log_2 \Sigma_{n=1}^{N_{TRP}} \binom{N_1 N_2}{L_n} \right\rceil$$

bits (bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.

In one example, $L_n$s associated with TRPs that are selected are explicitly reported via a joint indicator or separate multiple indicators in CSI part 1. In CSI part 1, $N_{TRP}$-bit bitmap is used to indicate selected N TRPs out of $N_{TRP}$ TRPs. For example, when $N_{TRP}$=4 and $N_{TRP}$-bit bitmap is '1001' in CSI part 1, the first TRP and the fourth TRP are selected. In this example, $L_n$ associated with the selected TRPs are explicitly reported.

In one example, a joint indicator can be used to indicate $\{L_n\}_{n \in S}$ under the constraint of $L_{tot}=\Sigma_{n \in S} L_n$ and $L_n \geq 1$, for n∈ S where $L_n$ is a positive integer and S is a set of selected TRP indexes (i.e., a subset of $\{1, 2, \ldots, N_{TRP}\}$.

In one example, a joint indicator can be used to indicate $\{L_n\}_{n=1}^N$ under the constraint of $L_{tot}=\Sigma_{n=1}^N L_n$ and $L_n \geq 1$, for n=1, . . . , N where $L_n$ is a positive integer.

In one example, an indicator can be used to indicate each $L_n$ for $n \in S$ under the constraint of $L_{tot}=\Sigma_{n \in S} L_n$ and $L_n \geq 1$ where $L_n$ is a positive integer and S is a set of selected TRP indexes (i.e., a subset of $\{1, 2, \ldots, N_{TRP}\}$.

In one example, an indicator can be used to indicate each $L_n$ for $n=1, \ldots, N$ under the constraint of $L_{tot}=\Sigma_{n=1}^{N}L_n$ and $L_n \geq 1$, for $n=1, \ldots, N$ where $L_n$ is a positive integer.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW, where $n \in S$ or $n=1, \ldots, N$.

In one example, a joint indicator to indicate $\{L_n\}$ SD basis vectors has the payload of $$\left\lceil \log_2 \Sigma_{n=1}^{N} \binom{N_1 N_2}{L_n} \right\rceil$$

bits or $$\left\lceil \log_2 \Sigma_{n \in S} \binom{N_1 N_2}{L_n} \right\rceil$$

bits.

In one example, $L_n$s associated with TRPs that are selected are explicitly reported via a joint indicator or separate multiple indicators in CSI part 2. The remaining part is similar to examples described above.

In one example, some of $\{L_n, n=1, \ldots, N_{TRP}\}$ are explicitly reported via a joint indicator or separate multiple indicators in CSI part 1 and the others of $\{L_n, n=1, \ldots, N_{TRP}\}$ are reported implicitly (or determined implicitly hence not explicitly reported).

In one example, a joint indicator can be used to indicate $(L_1, \ldots, L_{N_{TRP}-1})$, (i.e., excluding L with the highest index), and $L_{N_{TRP}}$ is implicitly determined by $(L_1, \ldots, L_{N_{TRP}-1})$ and $L_{tot}=\Sigma_{n=1}^{N_{TRP}}L_n$ hence $L_{N_{TRP}}$ is not reported. Here, $L_n \geq 0$, for $n=1, \ldots, N_{TRP}-1$ where $L_n$ is a non-negative integer.

In one example, a joint indicator can be used to indicate $(L_2, \ldots, L_{N_{TRP}})$, (i.e., excluding L with the lowest index), and $L_1$ is implicitly determined by $(L_2, \ldots, L_{N_{TRP}})$ and $L_{tot}=\Sigma_{n=1}^{N_{TRP}}L_n$ hence $L_{N_{TRP}}$ is not reported. Here, $L_n \geq 0$, for $n=2, \ldots, N_{TRP}$ where $L_n$ is a non-negative integer.

In one example, a joint indicator can be used to indicate $\{L_n\}_{n \in \{1, \ldots, N_{TRP}\} \setminus \{n^*\}}$ (i.e., excluding L with a reference TRP index $n^*$, which can be determined by UE or configured by NW or determined by a pre-defined rule), and $L_{n^*}$ is implicitly determined by $\{L_n\}_{n \in \{1, \ldots, N_{TRP}\} \setminus \{n^*\}}$ and $L_{tot}=\Sigma_{n=1}^{N_{TRP}}L_n$ hence $L_{n^*}$ is not reported. Here, $L_n \geq 0$, for $n \in \{1, \ldots, N_{TRP}\} \setminus \{n^*\}$ where $L_n$ is a non-negative integer.

In one example, an indicator can be used to indicate each $L_n$ for $n=1, \ldots, N_{TRP}-1$ (i.e., excluding L with the highest index), and $L_{N_{TRP}}$ is implicitly determined by $L_1, \ldots, L_{N_{TRP}-1}$ and $L_{tot}=\Sigma_{n=1}^{N_{TRP}}L_n$ hence $L_{N_{TRP}}$ is not reported. Here, $L_n \geq 0$, for $n=1, \ldots, N_{TRP}-1$ where $L_n$ is a non-negative integer.

In one example, an indicator can be used to indicate each $L_n$ for $n=2, \ldots, N_{TRP}$ (i.e., excluding L with the lowest index), and $L_1$ is implicitly determined by $L_2, \ldots, L_{N_{TRP}}$ and $L_{tot}=\Sigma_{n=1}^{N_{TRP}}L_n$ hence $L_1$ is not reported. Here, $L_n \geq 0$, for $n=2, \ldots, N_{TRP}$ where $L_n$ is a non-negative integer.

In one example, an indicator can be used to indicate each $L_n$ for $n \in \{1, \ldots, N_{TRP}\} \setminus \{n^*\}$ (i.e., excluding L with a reference TRP index $n^*$, which can be determined by UE or configured by NW or determined by a pre-defined rule), and $L_{n^*}$ is implicitly determined by $\{L_n\}_{n \in \{1, \ldots, N_{TRP}\} \setminus \{n^*\}}$ and $L_{tot}=\Sigma_{n=1}^{N_{TRP}}L_n$ hence $L_{n^*}$ is not reported. Here, $L_n \geq 0$, for $n \in \{1, \ldots, N_{TRP}\} \setminus \{n^*\}$ where $L_n$ is a non-negative integer.

In one example, $L_n$ SD basis vector selection for each TRP n is reported via a joint indicator or separate multiple indicators in CSI part 2. (Similar to/same as example 1.2.1.1)

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.

In one example, a joint indicator to indicate $\{L_n\}$ SD basis vectors has the payload of $$\left\lceil \log_2 \Sigma_{n=1}^{N_{TRP}} \binom{N_1 N_2}{L_n} \right\rceil$$

bits (bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.

In one example, some of $L_n$s associated with TRPs that are selected are explicitly reported via a joint indicator or separate multiple indicators in CSI part 1 and the others of $L_n$s associated with TRPs that are selected are reported implicitly (or determined implicitly hence not explicitly reported). In CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. In this example, some of $L_n$ associated with the selected TRPs are explicitly reported and the others are implicitly determined.

In one example, a joint indicator can be used to indicate $\{L_n\}_{n \in S \setminus \{n_{Low}\}}$ and $L_{n_{Low}}$ is implicitly determined by $\{L_n\}_{n \in S \setminus \{n_{Low}\}}$ and $L_{tot}=\Sigma_{n \in S} L_n$ and $L_n \geq 1$ for $n \in S \setminus \{n_{Low}\}$ where $L_n$ is a positive integer and S is a set of selected TRP indexes (i.e., a subset of $\{1, 2, \ldots, N_{TRP}\}$) and $n_{Low}$ is the lowest index in S.

In one example, a joint indicator can be used to indicate $\{L_n\}_{n \in S \setminus \{n_{High}\}}$ and $L_{n_{High}}$ is implicitly determined by $\{L_n\}_{n \in S \setminus \{n_{High}\}}$ and $L_{tot} = \Sigma_{n \in S} L_n$ and $L_n \geq 1$ for $n \in S \setminus \{n_{High}\}$ where $L_n$ is a positive integer and S is a set of selected TRP indexes (i.e., a subset of $\{1, 2, \ldots, N_{TRP}\}$) and $n_{High}$ is the highest index in S.

In one example, a joint indicator can be used to indicate $\{L_n\}_{n \in S \setminus \{n^*\}}$ and $L_{n^*}$ is implicitly determined by $\{L_n\}_{n \in S \setminus \{n^*\}}$ and $L_{tot} = \Sigma_{n \in S} L_n$ and $L_n \geq 1$ for $n \in S \setminus \{n^*\}$ where $L_n$ is a positive integer and S is a set of selected TRP indexes (i.e., a subset of $\{1, 2, \ldots, N_{TRP}\}$) and $n^*$ is a reference TRP index in S, which can be determined by UE or configured by NW or determined by a pre-defined rule.

In one example, a joint indicator can be used to indicate $\{L_n\}_{n=1}^{N-1}$ and $L_N$ is implicitly determined by $\{L_n\}_{n=1}^{N-1}$ and $L_{tot} = \Sigma_{n=1}^{N} L_n$ and $L_n \geq 1$, for $n=1, \ldots, N-1$ where $L_n$ is a positive integer.

In one example, a joint indicator can be used to indicate $\{L_n\}_{n=2}^{N}$ and $L_1$ is implicitly determined by $\{L_n\}_{n=2}^{N}$ and $L_{tot} = \Sigma_{n=1}^{N} L_n$ and $L_n \geq 1$, for $n=2, \ldots, N$ where $L_n$ is a positive integer.

In one example, a joint indicator can be used to indicate $\{L_n\}_{n \in \{1, \ldots, N\} \setminus \{n^*\}}$ and $L_{n^*}$ is implicitly determined by $\{L_n\}_{n \in \{1, \ldots, N\} \setminus \{n^*\}}$ and $L_{tot} = \Sigma_{n=1}^{N} L_n$ and $L_n \geq 1$, for $n \in \{1, \ldots, N\} \setminus \{n^*\}$ where $L_n$ is a positive integer.

In one example, an indicator can be used to indicate each $L_n$ for $n \in S \setminus \{n_{Low}\}$ and $L_{n_{Low}}$ is implicitly determined by $\{L_n\}_{n \in S \setminus \{n_{Low}\}}$ and $L_{tot} = \Sigma_{n \in S} L_n$ and $L_n \geq 1$ for $n \in S \setminus \{n_{Low}\}$ where $L_n$ is a positive integer and S is a set of selected TRP indexes (i.e., a subset of $\{1, 2, \ldots, N_{TRP}\}$) and $n_{Low}$ is the lowest index in S.

In one example, an indicator can be used to indicate each $L_n$ for $n \in S \setminus \{n_{High}\}$ and $L_{n_{High}}$ is implicitly determined by $\{L_n\}_{n \in S \setminus \{n_{High}\}}$ and $L_{tot} = \Sigma_{n \in S} L_n$ and $L_n \geq 1$ for $n \in S \setminus \{n_{High}\}$ where $L_n$ is a positive integer and S is a set of selected TRP indexes (i.e., a subset of $\{1, 2, \ldots, N_{TRP}\}$) and $n_{High}$ is the highest index in S.

In one example, an indicator can be used to indicate each $L_n$ for $n \in S \setminus \{n^*\}$ and $L_{n^{\{*\}}}$ is implicitly determined by $\{L_n\}_{n \in S \setminus \{n^*\}}$ and $L_{tot} = \Sigma_{n \in S} L_n$ and $L_n \geq 1$ for $n \in S \setminus \{n^*\}$ where $L_n$ is a positive integer and S is a set of selected TRP indexes (i.e., a subset of $\{1, 2, \ldots, N_{TRP}\}$) and $n^*$ is a reference TRP index in S, which can be determined by UE or configured by NW or determined by a pre-defined rule.

In one example, an indicator can be used to indicate each $L_n$ for $n=1, \ldots, N-1$ and $L_N$ is implicitly determined by $\{L_n\}_{n=1}^{N-1}$ and $L_{tot} = \Sigma_{n=1}^{N} L_n$ and $L_n \geq 1$, for $n=1, \ldots, N-1$ where $L_n$ is a positive integer.

In one example, an indicator can be used to indicate each $L_n$ for $n=2, \ldots, N$ and $L_1$ is implicitly determined by $\{L_n\}_{n=2}^{N}$ and $L_{tot} = \Sigma_{n=1}^{N} L_n$ and $L_n \geq 1$, for $n=1, \ldots, N-1$ where $L_n$ is a positive integer.

In one example, an indicator can be used to indicate each $L_n$ for $n \in \{1, \ldots, N\} \setminus \{n^*\}$ and $L_{n^*}$ is implicitly determined by $\{L_n\}_{n \in \{1, \ldots, N\} \setminus \{n^*\}}$ and $L_{tot} = \Sigma_{n=1}^{N} L_n$ and $L_n \geq 1$, for $n \in \{1, \ldots, N\} \setminus \{n^*\}$ where $L_n$ is a positive integer.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of ($N_1$, $N_2$) configured via higher-layer (RRC) signaling by the NW, where $n \in S$ or $n=1, \ldots, N$.

In one example, a joint indicator to indicate $\{L_n\}$ SD basis vectors has the payload of $$\left\lceil \log_2 \sum_{n=1}^{N} \binom{N_1 N_2}{L_n} \right\rceil$$

bits or $$\left\lceil \log_2 \sum_{n \in S} \binom{N_1 N_2}{L_n} \right\rceil$$

bits.

In one example, some of $L_n$s associated with TRPs that are selected are explicitly reported via a joint indicator or separate multiple indicators in CSI part 2 and the others of $L_n$s associated with TRPs that are selected are reported implicitly (or determined implicitly hence not explicitly reported). The remaining part is similar to examples described above).

In one example, $\{L_n, n=1, \ldots, N_{TRP}\}$ are reported implicitly, according to at least one of the following examples.

In one example, $L_{tot}$ SD basis vectors are selected among all candidates of SD basis vectors across $N_{TRP}$ TRPs and the selection of $L_{tot}$ SD basis vectors is reported via an indicator with size of $$\left\lceil \log_2 \binom{N_{TRP} N_1 N_2}{L_{tot}} \right\rceil$$

bits in CSI part 1. In this case, $L_n$ is implicitly determined by counting the number of selected SD basis vectors that belong to the candidate SD basis vectors of each TRP.

In one example, $L_{tot}$ SD basis vectors are selected among all candidates of SD basis vectors across $N_{TRP}$ TRPs and the selection of $L_{tot}$ SD basis vectors is reported via an indicator with size of $$\left\lceil \log_2 \binom{N_{TRP} N_1 N_2}{L_{tot}} \right\rceil$$

bits in CSI part 2. In this case, $L_n$ is implicitly determined by counting the number of selected SD basis vectors that belong to the candidate SD basis vectors of each TRP.

In one example, $L_{tot}$ SD basis vectors are selected among all candidates of SD basis vectors across N TRPs, where N is a number of selected TRPs. For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. The selection of $L_{tot}$ SD basis vectors is reported via an indicator with size of $$\left\lceil \log_2 \binom{NN_1N_2}{L_{tot}} \right\rceil$$

bits in CSI part 1. In this case, $L_n$ is implicitly determined by counting the number of selected SD basis vectors that belong to the candidate SD basis vectors of each of the selected TRPs.

In one example, $L_{tot}$ SD basis vectors are selected among all candidates of SD basis vectors across N TRPs, where N is a number of selected TRPs. For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. The selection of $L_{tot}$ SD basis vectors is reported via an indicator with size of $$\left\lceil \log_2 \binom{NN_1N_2}{L_{tot}} \right\rceil$$

bits in CSI part 2. In this case, $L_n$ is implicitly determined by counting the number of selected SD basis vectors that belong to the candidate SD basis vectors of each of the selected TRPs.

In one example, for a given $L_{tot}$, a set $\mathcal{L}$ for the value of $L_n$ for $n=1, \ldots, N_{TRP}$ is predetermined and an element of the set is selected and reported. For example, a combination of the elements each of which corresponds to $L_n$ is reported via a joint indicator or separate multiple indicators (that indicate(s) the index of the selected element in the set) in CSI part 1.

In one example, $\mathcal{L}$ is a subset of $\{1, 2, \ldots, L_{tot}\}$. In one example, $\mathcal{L}$ is a subset of $\{1, 2, \ldots, 6\}$. For example, $\mathcal{L}=\{1, 2, 4, 6\}$. For example, $\mathcal{L}=\{1, 2, 3, 4\}$. For example, $\mathcal{L}=\{2, 4, 6\}$. For example, $\mathcal{L}=\{2, 3, 4\}$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1N_2}{L_n} \right\rceil$$

bits (bit-width), where $N_1$ and $N_2$ are the values of $(N_1, N_2)$ configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.

In one example, a joint indicator to indicate $\{L_n\}$ SD basis vectors has the payload of $$\left\lceil \log_2 \Sigma_{n=1}^{N_{TRP}} \binom{N_1N_2}{L_n} \right\rceil$$

bits (bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.

In one example, for a given $L_{tot}$, a set $\mathcal{L}$ for the value of $L_n$ for $n \in S$ or $n=1, \ldots, N$ is predetermined and an index of the set is selected and reported, where S is a set of selected TRPs. (For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected.) In one example, a combination of indexes each of which corresponds to $L_n$ is reported via a joint indicator or separate multiple indicators in CSI part 1.

In one example, $\mathcal{L}$ is a subset of $\{1, 2, \ldots, L_{tot}\}$. In one example, $\mathcal{L}$ is a subset of $\{1, 2, \ldots, 6\}$. For example, $\mathcal{L}=\{1, 2, 4, 6\}$. For example, $\mathcal{L}=\{1, 2, 3, 4\}$. For example, $\mathcal{L}=\{2, 4, 6\}$. For example, $\mathcal{L}=\{2, 3, 4\}$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1N_2}{L_n} \right\rceil$$

bits (bit-width), where $N_1$ and $N_2$ are the values of $(N_1, N_2)$ configured via higher-layer (RRC) signaling by the NW, where $n \in S$ or $n=1, \ldots, N$.

In one example, a joint indicator to indicate $\{L_n\}$ SD basis vectors has the payload of $$\left\lceil \log_2 \Sigma_{n=1}^{N} \binom{N_1N_2}{L_n} \right\rceil$$

bits or $$\left\lceil \log_2 \sum_{n \in S} \binom{N_1N_2}{L_n} \right\rceil$$

bits.

In one example, for a given $L_{tot}$, a set for the value of $L_n$ for $n \in S$ or $n=1, \ldots, N$ is predetermined and an index of the set is selected and reported, where S is a set of selected TRPs. (For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected.) In one example, a combination of indexes each of which corresponds to $L_n$ is reported via a joint indicator or separate multiple indicators in CSI part 2. The remaining part is similar to or the same as one or more examples described above.

In one embodiment, on the SD basis selection for (Rel-18) Type-II codebook refinement for CJT mTRP, an L parameter is configured by NW via higher-layer (RRC) signaling and $\{L_n, n=1, \ldots, N_{TRP}\}$ are determined from the value of L, where $N_{TRP}$ is a number of TRPs configured by the NW. In one example, $N_{TRP} \in \{1, 2, 3, 4\}$.

In one example, one L value is associated with a reference TRP n* and another value determined from L is associated with the remaining $N_{TRP}-1$ (or N−1) TRPs. In one example, $L_{n*}=L$ and $$L_n = \left\lceil \frac{L}{2} \right\rceil$$

for n≠n*. In one example, $L_{n^*}=L$ and $$L_n = \left\lceil \frac{L}{x} \right\rceil$$

for n≠n*, where x=2, 3, or 4, . . . and so on.

In one example, a reference TRP n* is configured by NW.

In one example, a reference TRP n* is determined by UE and reported in CSI part 1 or CSI part 2.

In one example, a reference TRP n* is fixed to 1 or the last index, e.g., $N_{TRP}$ or N, or another value $n^* \in \{1, \ldots, N_{TRP}\}$ In one embodiment, on the SD basis selection for (Rel-18) Type-II codebook refinement for CJT mTRP, $L_{max} \geq \Sigma_{n=1}^{N_{TRP}} L_n$ is configured by NW via higher-layer (RRC) signaling and the relative value(s) of $\{L_n, n=1, \ldots, N_{TRP}\}$ are reported by the UE, where $N_{TRP}$ is a number of TRPs configured by the NW. Although we denote $L_{max}$ for an upper bound of $\Sigma_{n=1}^{N_{TRP}} L_n$, another notation can be used for $L_{max}$, such as $L_{sum}$, L', L, etc. In one example, $N_{TRP} \in \{1, 2, 3, 4\}$.

In one example, $L_{max} \in \{2N_{TRP}, 4N_{TRP}, 6N_{TRP}\}$. In one example, $L_{max} \in \{1N_{TRP}, 2N_{TRP}, 4N_{TRP}, 6N_{TRP}\}$ In one example, $L_{max} \in \{1N_{TRP}, 2N_{TRP}, 3N_{TRP}, 4N_{TRP}, 5N_{TRP}, 6N_{TRP}\}$. In one example, In one example, $L_{max} \in \{1N_{TRP}, 2N_{TRP}, 3N_{TRP}, 4N_{TRP}\}$. In one example, $L_{max} \in \{1N_{TRP}, 2N_{TRP}, 3N_{TRP}\}$.

In one example, $L_{max} \in \{1N_{TRP}, 2N_{TRP}, 4N_{TRP}\}$. In one example, $L_{max}$ can be selected from $\mathcal{L}_{max}$, where $\mathcal{L}_{max}$ is a subset of $\{1, \ldots, 24\}$.

In one example, $L_{max} \in \mathcal{L}_{max,1}$ for $N_{TRP} \geq x$ and $L_{max} \in \mathcal{L}_{max,2}$ for $N_{TRP} < x$, where $\mathcal{L}_{max,1}$ and $\mathcal{L}_{max,2}$ is a subset of $\{1, \ldots, 24\}$ and x=1, 2, 3, or 4.

In one example, $L_{max} \in \mathcal{L}_{max,1}$ for $N_{TRP} > x$ and $L_{max} \in \mathcal{L}_{max,2}$ for $N_{TRP} \leq x$, where $\mathcal{L}_{max,1}$ and $\mathcal{L}_{max,2}$ is a subset of $\{1, \ldots, 24\}$ and x=1, 2, 3, or 4.

In one example, $\{L_n, n=1, \ldots, N_{TRP}\}$ are explicitly reported via a joint indicator or separate multiple indicators in CSI part 1. For example, a joint indicator can be used to indicate $(L_1, \ldots, L_{N_{TRP}})$ under the constraint of $L_{max} \geq \Sigma_{n=1}^{N_{TRP}} L_n$ and $L_n \geq 0$, for n=1, \ldots, $N_{TRP}$ where $L_n$ is a non-negative integer. In another example, an indicator can be used to indicate each $L_n$ for n=1, \ldots, $N_{TRP}$ under the constraint of $L_{max} \geq \Sigma_{n=1}^{N_{TRP}} L_n$ and $L_n \geq 0$. In one example, each $L_n$ is selected from a set $\mathcal{L}$ and indicated via $\lceil \log_2 |\mathcal{L}| \rceil$-bit indicator. So, in this case, $N_{TRP} \lceil \log_2 |\mathcal{L}| \rceil$-bit indicators can be used. In one example, $\mathcal{L} \in \{2, 4\}$. In one example, $\mathcal{L} \in \{2, 4, 6\}$. In one example, $\mathcal{L} \in \{1, 2, 3, 4\}$. In one example, $\mathcal{L} \in \{1, 2, 3, 4, 5, 6\}$. In one example, $\mathcal{L} \in \{1, 2, 4\}$. In one example, $\mathcal{L} \in \{1, 2, 3\}$. In one example, $\mathcal{L}$ is a subset of $\{1, 2, 3, 4, 5, 6\}$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of ($N_1$, $N_2$) configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.

In one example, a joint indicator to indicate $\{L_n\}$ SD basis vectors has the payload of $$\left\lceil \log_2 \Sigma_{n=1}^{N_{TRP}} \binom{N_1 N_2}{L_n} \right\rceil$$

bits (bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.

In one example, $L_n$s associated with TRPs that are selected are explicitly reported via a joint indicator or separate multiple indicators in CSI part 1. In CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. In this example, $L_n$ associated with the selected TRPs are explicitly reported.

In one example, a joint indicator can be used to indicate $\{L_n\}_{n \in S}$ under the constraint of $L_{max} \geq \Sigma_{n \in S} L_n$ and $L_n \geq 1$, for $n \in S$ where $L_n$ is a positive integer and S is a set of selected TRP indexes (i.e., a subset of $\{1, 2, \ldots, N_{TRP}\}$.

In one example, a joint indicator can be used to indicate $\{L_n\}_{n=1}^N$ under the constraint of $L_{max} \geq \Sigma_{n=1}^N L_n$ and $L_n \geq 1$, for n=1, \ldots, N where $L_n$ is a positive integer.

In one example, an indicator can be used to indicate each $L_n$ for $n \in S$ under the constraint of $L_{max} > \Sigma_{n \in S} L_n$ and $L_n \geq 1$ where $L_n$ is a positive integer and S is a set of selected TRP indexes (i.e., a subset of $\{1, 2, \ldots, N_{TRP}\}$. In one example, each $L_n$ is selected from a set $\mathcal{L}$ and indicated via $\lceil \log_2 |\mathcal{L}| \rceil$-bit indicator. So, in this case, N $\lceil \log_2 |\mathcal{L}| \rceil$-bit indicators can be used. In one example, $\mathcal{L} \in \{2, 4\}$. In one example, $\mathcal{L} \in \{2, 4, 6\}$. In one example, $\mathcal{L} \in \{1, 2, 3, 4\}$. In one example, $\mathcal{L} \in \{1, 2, 3, 4, 5, 6\}$. In one example, $\mathcal{L} \in \{1, 2, 4\}$. In one example, $\mathcal{L} \in \{1, 2, 3\}$. In one example, $\mathcal{L}$ is a subset of $\{1, 2, 3, 4, 5, 6\}$.

In one example, an indicator can be used to indicate each $L_n$ for n=1, \ldots, N under the constraint of $L_{max} \geq \Sigma_{n=1}^N L_n$ and $L_n \geq 1$, for n=1, \ldots, N where $L_n$ is a positive integer. In one example, each $L_n$ is selected from a set $\mathcal{L}$ and indicated via $\lceil \log_2 |\mathcal{L}| \rceil$-bit indicator. So, in this case, N $\lceil \log_2 |\mathcal{L}| \rceil$-bit indicators can be used. In one example, $\mathcal{L} \in \{2, 4\}$. In one example, $\mathcal{L} \in \{2, 4, 6\}$. In one example, $\mathcal{L} \in \{1, 2, 3, 4\}$. In one example, $\mathcal{L} \in \{1, 2, 3, 4, 5, 6\}$. In one example, $\mathcal{L} \in \{1, 2, 4\}$. In one example, $\mathcal{L} \in \{1, 2, 3\}$. In one example, $\mathcal{L}$ is a subset of $\{1, 2, 3, 4, 5, 6\}$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of ($N_1$, $N_2$) configured via higher-layer (RRC) signaling by the NW, where $n \in S$ or $n=1, \ldots, N$.

In one example, a joint indicator to indicate $\{L_n\}$ SD basis vectors has the payload of $$\left\lceil \log_2 \Sigma_{n=1}^{N} \binom{N_1 N_2}{L_n} \right\rceil$$

bits or $$\left\lceil \log_2 \sum_{n \in S} \binom{N_1 N_2}{L_n} \right\rceil$$

bits.

In one example, $L_n$s associated with TRPs that are selected are explicitly reported via a joint indicator or separate multiple indicators in CSI part 2. The remaining part is similar to one or more exampled described above. For example, when $N_{TRP}=4$ and $N_{TRP}$-bit bitmap is '1001' in CSI part 1, the first TRP and the fourth TRP are selected. In this example, $L_n$ associated with the selected TRPs are explicitly reported.

In one example, a joint indicator can be used to indicate $\{L_n\}_{n \in S}$ under the constraint of $L_{max} \geq \Sigma_{n \in S} L_n$ and $L_n \geq 1$, for $n \in S$ where $L_n$ is a positive integer and S is a set of selected TRP indexes (i.e., a subset of $\{1, 2, \ldots, N_{TRP}\}$.

In one example, a joint indicator can be used to indicate $\{L_n\}_{n=1}^{N}$ under the constraint of $L_{max} \geq \Sigma_{n=1}^{N} L_n$ and $L_n \geq 1$, for $n=1, \ldots, N$ where $L_n$ is a positive integer.

In one example, an indicator can be used to indicate each $L_n$ for $n \in S$ under the constraint of $L_{max} \geq \Sigma_{n \in S} L_n$ and $L_n \geq 1$ where $L_n$ is a positive integer and S is a set of selected TRP indexes (i.e., a subset of $\{1, 2, \ldots, N_{TRP}\}$. In one example, each $L_n$ is selected from a set $\mathcal{L}$ and indicated via $\lceil \log_2 |\mathcal{L}| \rceil$-bit indicator. So, in this case, $N \lceil \log_2 |\mathcal{L}| \rceil$-bit indicators can be used. In one example, $\mathcal{L} \in \{2, 4\}$. In one example, $\mathcal{L} \in \{2, 4, 6\}$. In one example, $\mathcal{L} \in \{1, 2, 3, 4\}$. In one example, $\mathcal{L} \in \{1, 2, 3, 4, 5, 6\}$. In one example, $\mathcal{L} \in \{1, 2, 4\}$. In one example, $\mathcal{L} \in \{1, 2, 3\}$. In one example, $\mathcal{L}$ is a subset of $\{1, 2, 3, 4, 5, 6\}$.

In one example, an indicator can be used to indicate each $L_n$ for $n=1, \ldots, N$ under the constraint of $L_{max} \geq \Sigma_{n=1}^{N} L_n$ and $L_n \geq 1$, for $n=1, \ldots, N$ where $L_n$ is a positive integer. In one example, each $L_n$ is selected from a set L and indicated via $\lceil \log_2 |\mathcal{L}| \rceil$-bit indicator. So, in this case, $N \lceil \log_2 |\mathcal{L}| \rceil$-bit indicators can be used. In one example, $\mathcal{L} \in \{2, 4\}$. In one example, $\mathcal{L} \in \{2, 4, 6\}$. In one example, $\mathcal{L} \in \{1, 2, 3, 4\}$. In one example, $\mathcal{L} \in \{1, 2, 3, 4, 5, 6\}$. In one example, $\mathcal{L} \in \{1, 2, 4\}$. In one example, $\mathcal{L} \in \{1, 2, 3\}$. In one example, $\mathcal{L}$ is a subset of $\{1, 2, 3, 4, 5, 6\}$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of ($N_1$, $N_2$) configured via higher-layer (RRC) signaling by the NW, where $n \in S$ or $n=1, \ldots, N$.

In one example, a joint indicator to indicate $\{L_n\}$ SD basis vectors has the payload of $$\left\lceil \log_2 \Sigma_{n=1}^{N} \binom{N_1 N_2}{L_n} \right\rceil$$

bits or $$\left\lceil \log_2 \sum_{n \in S} \binom{N_1 N_2}{L_n} \right\rceil$$

bits.

In one embodiment, $L_{tot}$ is determined by UE where $L_{max} \geq L_{tot} = \Sigma_{n=1}^{N_{TRP}} L_n$ and the determined $L_{tot}$ is reported in CSI part 1. In one example, an indicator to indicate $L_{tot}$ has the size of payload $\lceil \log_2 L_{max} \rceil$ bits, i.e., $L_{tot}$ is selected from $\{1, 2, \ldots, L_{max}\}$. In another example, an indicator to indicate $L_{tot}$ has the size of payload $\lceil \log_2 |\mathcal{L}_{tot}| \rceil$ bits, where $\mathcal{L}_{tot}$ is a set including $L_{max}$ and positive integers less than or equal to $L_{max}$, and $|\mathcal{L}_{tot}|$ is a number of the elements in $\mathcal{L}_{tot}$. In one example, $\mathcal{L}_{tot}$ can be any subset of $\{1, 2, \ldots, L_{max}\}$. In one example, $\mathcal{L}_{tot}$ can be any subset of $$\left\{ \left\lceil \frac{L_{max}}{4} \right\rceil, \left\lceil \frac{L_{max}}{3} \right\rceil, \left\lceil \frac{L_{max}}{2} \right\rceil, L_{max} \right\}.$$

In one example, $L_{tot} \in \{2N_{TRP}, 4N_{TRP}, 6N_{TRP}\}$. In one example, $L_{tot} \in \{1N_{TRP}, 2N_{TRP}, 4N_{TRP}, 6N_{TRP}\}$. In one example, $L_{tot} \in \{1N_{TRP}, 2N_{TRP}, 3N_{TRP}, 4N_{TRP}, 5N_{TRP}, 6N_{TRP}\}$. In one example, In one example, $L_{tot} \in \{1N_{TRP}, 2N_{TRP}, 3N_{TRP}, 4N_{TRP}\}$. In one example, $L_{tot} \in \{1N_{TRP}, 2N_{TRP}, 3N_{TRP}\}$.

In one example, $L_{tot} \in \{1N_{TRP}, 2N_{TRP}, 4N_{TRP}\}$. In one example, $L_{tot}$ can be selected from a subset of $\{1, \ldots, 24\}$.

In one example, $L_{tot} \in \{2N_{TRP}, 4N_{TRP}, 6N_{TRP}\} \cap \{1, 2, \ldots, L_{max}\}$. In one example, $L_{tot} \in \{1N_{TRP}, 2N_{TRP}, 4N_{TRP}, 6N_{TRP}\} \cap \{1, 2, \ldots, L_{max}\}$. In one example, $L_{tot} \in \{1N_{TRP}, 2N_{TRP}, 3N_{TRP}, 4N_{TRP}, 5N_{TRP}, 6N_{TRP}\} \cap \{1, 2, \ldots, L_{max}\}$. In one example, In one example, $L_{tot} \in \{1N_{TRP}, 2N_{TRP}, 3N_{TRP}, 4N_{TRP}\} \cap \{1, 2, \ldots, L_{max}\}$. In one example, $L_{tot} \in \{1N_{TRP}, 2N_{TRP}, 3N_{TRP}\} \cap \{1, 2, \ldots, L_{max}\}$.

In one example, $L_{tot} \in \{1N_{TRP}, 2N_{TRP}, 4N_{TRP}\} \cap \{1, 2, \ldots, L_{max}\}$. In one example, $L_{tot}$ can be selected from a subset of $\{1, \ldots, 24\} \cap \{1, 2, \ldots, L_{max}\}$.

In one example, some of $\{L_n, n=1, \ldots, N_{TRP}\}$ are explicitly reported via a joint indicator or separate multiple indicators in CSI part 1 and the others of $\{L_n, n=1, \ldots, N_{TRP}\}$ are reported implicitly (or determined implicitly hence not explicitly reported).

In one example, a joint indicator can be used to indicate $(L_1, \ldots, L_{N_{TRP}-1})$, (i.e., excluding L with the highest index), and $L_{N_{TRP}}$ is implicitly determined by $(L_1, \ldots, L_{N_{TRP}-1})$ and $L_{tot} = \Sigma_{n=1}^{N_{TRP}} L_n$ hence $L_{N_{TRP}}$ is not reported. Here, $L_n \geq 0$, for $n=1, \ldots, N_{TRP}-1$ where $L_n$ is a non-negative integer.

In one example, a joint indicator can be used to indicate $(L_2, \ldots, L_{N_{TRP}})$, (i.e., excluding L with the lowest index), and $L_1$ is implicitly determined by $(L_2, \ldots,$ $L_{N_{TRP}}$) and $L_{tot}=\sum_{n=1}^{N_{TRP}}L_n$ hence $L_1$ is not reported. Here, $L_n \geq 0$, for $n=2, \ldots, N_{TRP}$ where $L_n$ is a non-negative integer.

In one example, a joint indicator can be used to indicate $\{L_n\}_{n \in \{1, \ldots, N_{TRP}\} \backslash \{n^*\}}$ (i.e., excluding L with a reference TRP index n*, which can be determined by UE or configured by NW or determined by a pre-defined rule), and $L_{n^*}$ is implicitly determined by $\{L_n\}_{n \in \{1, \ldots, N_{TRP}\} \backslash \{n^*\}}$ and $L_{tot}=\sum_{n=1}^{N_{TRP}}L_n$ hence $L_{n^*}$ is not reported. Here, $L_n \geq 0$, for $n \in \{1, \ldots, N_{TRP}\} \backslash \{n^*\}$ where $L_n$ is a non-negative integer.

In one example, an indicator can be used to indicate each $L_n$ for $n=1, \ldots, N_{TRP}-1$ (i.e., excluding L with the highest index), and $L_{N_{TRP}}$ is implicitly determined by $L_1, \ldots, L_{N_{TRP}-1}$ and $L_{tot}=\sum_{n=1}^{N_{TRP}}L_n$ hence $L_{N_{TRP}}$ is not reported. Here, $L_n \geq 0$, for $n=1, \ldots, N_{TRP}-1$ where $L_n$ is a non-negative integer.

In one example, an indicator can be used to indicate each $L_n$ for $n=2, \ldots, N_{TRP}$ (i.e., excluding L with the lowest index), and $L_1$ is implicitly determined by $L_2, \ldots, L_{N_{TRP}}$ and $L_{tot}=\sum_{n=1}^{N_{TRP}}L_n$ hence $L_1$ is not reported. Here, $L_n \geq 0$, for $n=2, \ldots, N_{TRP}$ where $L_n$ is a non-negative integer.

In one example, an indicator can be used to indicate each $L_i$, for $n \in \{1, \ldots, N_{TRP}\} \backslash \{n^*\}$ (i.e., excluding L with a reference TRP index n*, which can be determined by UE or configured by NW or determined by a pre-defined rule), and $L_{n^*}$ is implicitly determined by $\{L_n\}_{n \in \{1, \ldots, N_{TRP}\} \backslash \{n^*\}}$ and $L_{tot}=\Sigma\Sigma_{n=1}^{N_{TRP}}L_n$ hence $L_{n^*}$ is not reported. Here, $L_n \geq 0$, for $n \in \{1, \ldots, N_{TRP}\} \backslash \{n^*\}$ where $L_n$ is a non-negative integer.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.

In one example, a joint indicator to indicate $\{L_n\}$ SD basis vectors has the payload of $$\left\lceil \log_2 \Sigma_{n=1}^{N_{TRP}} \binom{N_1 N_2}{L_n} \right\rceil$$

bits (bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.

In one example, $L_{tot}$ SD basis vectors are selected among all candidates of SD basis vectors across $N_{TRP}$ TRPs and the selection of $L_{tot}$ SD basis vectors is reported via an indicator with size of $$\left\lceil \log_2 \binom{N_{TRP} N_1 N_2}{L_{tot}} \right\rceil$$

bits in CSI part 1. In this case, $L_n$ is implicitly determined by counting the number of selected SD basis vectors that belong to the candidate SD basis vectors of each TRP.

In one example, $L_{tot}$ SD basis vectors are selected among all candidates of SD basis vectors across $N_{TRP}$ TRPs and the selection of $L_{tot}$ SD basis vectors is reported via an indicator with size of $$\left\lceil \log_2 \binom{N_{TRP} N_1 N_2}{L_{tot}} \right\rceil$$

bits in CSI part 2. In this case, $L_n$ is implicitly determined by counting the number of selected SD basis vectors that belong to the candidate SD basis vectors of each TRP.

In one example, $L_{tot}$ SD basis vectors are selected among all candidates of SD basis vectors across N TRPs, where N is a number of selected TRPs. For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. The selection of $L_{tot}$ SD basis vectors is reported via an indicator with size of $$\left\lceil \log_2 \binom{N N_1 N_2}{L_{tot}} \right\rceil$$

bits in CSI part 1. In this case, $L_n$ is implicitly determined by counting the number of selected SD basis vectors that belong to the candidate SD basis vectors of each of the selected TRPs.

In one example, $L_{tot}$ SD basis vectors are selected among all candidates of SD basis vectors across N TRPs, where N is a number of selected TRPs. For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. The selection of $L_{tot}$ SD basis vectors is reported via an indicator with size of $$\left\lceil \log_2 \binom{N N_1 N_2}{L_{tot}} \right\rceil$$

bits in CSI part 2. In this case, $L_n$ is implicitly determined by counting the number of selected SD basis vectors that belong to the candidate SD basis vectors of each of the selected TRPs.

In one embodiment, $L_{tot}$ is determined by UE where $L_{max} \geq L_{tot} = \sum_{n=1}^{N} L_n$ (or $L_{max} \geq L_{tot} = \sum_{n \in S} L_n$), and the determined $L_{tot}$ is reported in CSI part 1. Here, N is a number of selected TRPs out of $N_{TRP}$ TRPs and S is a set of selected TRP indexes (i.e., a subset of $\{1, 2, \ldots, N_{TRP}\}$). Note that in CSI part 1, $N_{TRP}$-bit bitmap can be used to indicate selected N TRPs out of $N_{TRP}$ TRPs. In one example, an indicator to indicate $L_{tot}$ has the size of payload $\lceil \log_2 L_{max} \rceil$ bits, i.e., $L_{tot}$ is selected from $\{1, 2, \ldots, L_{max}\}$. In another example, an indicator to indicate $L_{tot}$ has the size of payload $\lceil \log_2 |\mathcal{L}_{tot}| \rceil$ bits, where tot is a set including $L_{max}$ and positive integers less than or equal to $L_{max}$, and $|\mathcal{L}_{tot}|$ is a number of the elements in $\mathcal{L}_{tot}$. In one example, $\mathcal{L}_{tot}$ can be any subset of $\{1, 2, \ldots, L_{max}\}$. In one example, $\mathcal{L}_{tot}$ can be any subset of $$\{\left\lceil\frac{L_{max}}{4}\right\rceil, \left\lceil\frac{L_{max}}{3}\right\rceil, \left\lceil\frac{L_{max}}{2}\right\rceil, L_{max}\}.$$

In one example, an indicator to indicate $L_{tot}$ has the size of payload $$\left\lceil\log_2\left(L_{max}\cdot\frac{N}{N_{TRP}}\right)\right\rceil$$

bits, i.e., $L_{tot}$ is selected from $$\{1, 2, \ldots, \left\lceil L_{max}\cdot\frac{N}{N_{TRP}}\right\rceil\}.$$

In one example, $L_{tot} \in \{2N, 4N, 6N\}$. In one example, $L_{tot} \in \{1N, 2N, 4N, 6N\}$. In one example, $L_{tot} \in \{1N, 2N, 3N, 4N, 5N, 6N\}$. In one example, In one example, $L_{tot} \in \{1N, 2N, 3N, 4N\}$. In one example, $L_{tot} \in \{1N, 2N, 3N\}$.

In one example, $L_{tot} \in \{1N, 2N, 4N\}$. In one example, $L_{tot}$ can be selected from a subset of $\{1, \ldots, 24\}$.

In one example, $L_{tot} \in \{2N, 4N, 6N\} \cap \{1, 2, L_{max}\}$ In one example, $L_{tot} \in \{1N, 2N, 4N, 6N\} \cap \{1, 2, \ldots, L_{max}\}$. In one example, $L_{tot} \in \{1N, 2N, 3N, 4N, 5N, 6N\} \cap \{1, 2, \ldots, L_{max}\}$. In one example, In one example, $L_{tot} \in \{1N, 2N, 3N, 4N\} \cap \{1, 2, \ldots, L_{max}\}$. In one example, $L_{tot} \in \{1N, 2N, 3N\} \cap \{1, 2, \ldots, L_{max}\}$.

In one example, $L_{tot} \in \{1N, 2N, 4N\} \cap \{1, 2, \ldots, L_{max}\}$. In one example, $L_{tot}$ can be selected from a subset of $\{1, \ldots, 24\} \cap \{1, 2, \ldots, L_{max}\}$.

In one example, some of $L_n$s associated with TRPs that are selected are explicitly reported via a joint indicator or separate multiple indicators in CSI part 1 and the others of $L_n$s associated with TRPs that are selected are reported implicitly (or determined implicitly hence not explicitly reported). In CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. In this example, some of $L_n$ associated with the selected TRPs are explicitly reported and the others are implicitly determined.

In one example, a joint indicator can be used to indicate $\{L_n\}_{n\in S\uparrow\{n_{Low}\}}$ and $L_{n_{Low}}$ is implicitly determined by $\{L_n\}_{n\in S\uparrow\{n_{Low}\}}$ and $L_{tot}=\Sigma_{n\in S}L_n$ and $L_n\geq 1$ for $n\in S\setminus\{n_{Low}\}$ where $L_n$ is a positive integer and S is a set of selected TRP indexes (i.e., a subset of $\{1, 2, \ldots, N_{TRP}\}$) and $n_{Low}$ is the lowest index in S.

In one example, a joint indicator can be used to indicate $\{L_n\}_{n\in S\uparrow\{n_{High}\}}$ and $L_{n_{High}}$ is implicitly determined by $\{L_n\}_{n\in S\uparrow\{n_{High}\}}$ and $L_{tot}=\Sigma_{n\in S}L_n$ and $L_n\geq 1$ for $n\in S\setminus\{n_{High}\}$ where $L_n$ is a positive integer and S is a set of selected TRP indexes (i.e., a subset of $\{1, 2, \ldots, N_{TRP}\}$) and $n_{High}$ is the highest index in S.

In one example, a joint indicator can be used to indicate $\{L_n\}_{n\in S\uparrow\{n^*\}}$ and $L_{n^*}$ is implicitly determined by $\{L_n\}_{n\in S\uparrow\{n^*\}}$ and $L_{tot}=\Sigma_{n\in S}L_n$ and $L_n\geq 1$ for $n\in S\setminus\{n^*\}$ where $L_n$ is a positive integer and S is a set of selected TRP indexes (i.e., a subset of $\{1, 2, \ldots, N_{TRP}\}$) and $n^*$ is a reference TRP index in S, which can be determined by UE or configured by NW or determined by a pre-defined rule.

In one example, a joint indicator can be used to indicate $\{L_n\}_{n=1}^{N-1}$ and $L_N$ is implicitly determined by $\{L_n\}_{n=1}^{N-1}$ and $L_{tot}=\Sigma_{n=1}^N L_n$ and $L_n\geq 1$, for $n=1, \ldots, N-1$ where $L_n$ is a positive integer.

In one example, a joint indicator can be used to indicate $\{L_n\}_{n=2}^N$ and $L_1$ is implicitly determined by $\{L_n\}_{n=2}^N$ and $L_{tot}=\Sigma_{n=1}^N L_n$ and $L_n\geq 1$, for $n=2, \ldots, N$ where $L_n$ is a positive integer.

In one example, a joint indicator can be used to indicate $\{L_n\}_{n\in\{1, \ldots, N\}\setminus\{n^*\}}$ and $L_{n^*}$ is implicitly determined by $\{L_n\}_{n\in\{1, \ldots, N\}\setminus\{n^*\}}$ and $L_{tot}=\Sigma_{n=1}^N L_n$ and $L_n\geq 1$, for $n\in\{1, \ldots, N\}\setminus\{n^*\}$ where $L_n$ is a positive integer.

In one example, an indicator can be used to indicate each $L_n$ for $n\in S\setminus\{n_{Low}\}$ and $L_{n_{Low}}$ is implicitly determined by $\{L_n\}_{n\in S\setminus\{n_{Low}\}}$ and $L_{tot}=\Sigma_{n\in S}L_n$ and $L_n\geq 1$ for $n\in S\setminus\{n_{Low}\}$ where $L_n$ is a positive integer and S is a set of selected TRP indexes (i.e., a subset of $\{1, 2, \ldots, N_{TRP}\}$) and $n_{Low}$ is the lowest index in S.

In one example, an indicator can be used to indicate each $L_n$ for $n\in S\setminus\{n_{High}\}$ and $L_{n_{High}}$ is implicitly determined by $\{L_n\}_{n\in S\setminus\{n_{High}\}}$ and $L_{tot}=\Sigma_{n\in S}L_n$ and $L_n\geq 1$ for $n\in S\setminus\{n_{High}\}$ where $L_n$ is a positive integer and S is a set of selected TRP indexes (i.e., a subset of $\{1, 2, \ldots, N_{TRP}\}$) and $n_{High}$ is the highest index in S.

In one example, an indicator can be used to indicate each $L_n$ for $n\in S\setminus\{n^*\}$ and $L_{n^{(n^*)}}$ is implicitly determined by $\{L_n\}_{n\in S\setminus\{n^*\}}$ and $L_{tot}=\Sigma_{n\in S}L_n$ and $L_n\geq 1$ for $n\in S\setminus\{n^*\}$ where $L_n$ is a positive integer and S is a set of selected TRP indexes (i.e., a subset of $\{1, 2, \ldots, N_{TRP}\}$) and $n^*$ is a reference TRP index in S, which can be determined by UE or configured by NW or determined by a pre-defined rule.

In one example, an indicator can be used to indicate each $L_n$ for $n=1, \ldots, N-1$ and $L_N$ is implicitly determined by $\{L_n\}_{n=1}^{N-1}$ and $L_{tot}=\Sigma_{n=1}^N L_n$ and $L_n\geq 1$, for $n=1, \ldots, N-1$ where $L_n$ is a positive integer.

In one example, an indicator can be used to indicate each $L_n$ for $n=2, \ldots, N$ and $L_1$ is implicitly determined by $\{L_n\}_{n=2}^N$ and $L_{tot}=\Sigma_{n=1}^N L_n$ and $L_n\geq 1$, for $n=1, \ldots, N-1$ where $L_n$ is a positive integer.

In one example, an indicator can be used to indicate each $L_n$ for $n\in\{1, \ldots, N\}\setminus\{n^*\}$ and $L_{n^*}$ is implicitly determined by $\{L_n\}_{n\in\{1, \ldots, N\}\setminus\{n^*\}}$ and $L_{tot}=\Sigma_{n=1}^N L_n$ and $L_n\geq 1$, for $n\in\{1, \ldots, N\}\setminus\{n^*\}$ where $L_n$ is a positive integer.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil\log_2\binom{N_1 N_2}{L_n}\right\rceil$$

bits (bit-width), where $N_1$ and $N_2$ are the values of ($N_1$, $N_2$) configured via higher-layer (RRC) signaling by the NW, where $n\in S$ or $n=1, \ldots, N$.

In one example, a joint indicator to indicate $\{L_n\}$ SD basis vectors has the payload of $$\left\lceil\log_2\Sigma_{n=1}^N\binom{N_1 N_2}{L_n}\right\rceil$$

bits or $$\left\lceil \log_2 \Sigma_{n \in S} \binom{N_1 N_2}{L_n} \right\rceil$$

bits.

In one example, some of $L_n$s associated with TRPs that are selected are explicitly reported via a joint indicator or separate multiple indicators in CSI part 2 and the others of $L_n$s associated with TRPs that are selected are reported implicitly (or determined implicitly hence not explicitly reported). The remaining part is similar to one or more examples described above.

In one example, $L_{tot}$ SD basis vectors are selected among all candidates of SD basis vectors across N TRPs. The selection of $L_{tot}$ SD basis vectors is reported via an indicator with size of $$\left\lceil \log_2 \binom{NN_1 N_2}{L_{tot}} \right\rceil$$

bits in CSI part 1. In this case, $L_n$ is implicitly determined by counting the number of selected SD basis vectors that belong to the candidate SD basis vectors of each of the selected TRPs.

In one example, $L_{tot}$ SD basis vectors are selected among all candidates of SD basis vectors across N TRPs. The selection of $L_{tot}$ SD basis vectors is reported via an indicator with size of $$\left\lceil \log_2 \binom{NN_1 N_2}{L_{tot}} \right\rceil$$

bits in CSI part 2. In this case, $L_n$ is implicitly determined by counting the number of selected SD basis vectors that belong to the candidate SD basis vectors of each of the selected TRPs.

In one embodiment, a bitmap with size of $NN_1N_2$ is used to indicate SD basis vectors for selected N TRPs (CSI-RS resources) in CSI part 2. For example, in the bitmap, '0' refers 'not selected' for corresponding SD vector and '1' refers 'selected' for corresponding SD vector. In this case, $L_i$, can be inferred from the bitmap, by counting the number of selected SD vectors corresponding to each TRP. In this case, a restriction can be described such as "UE shall not report a CSI with $L_{tot}=\Sigma_n L_n > L_{max}$, where $L_n$ is inferred from the bitmap".

In one embodiment, any combination or some of one or more embodiments described above can be configured by NW via higher-layer (RRC) signalling. In one example, any combination or some of examples in one or more embodiments described above can be configured by NW via higher-layer RRC signalling.

In one or more embodiments described above, $L_n$, $L_{tot}$, $L_{max}$ can be replaced by $\alpha_n$, $\alpha_{tot}$, $\alpha_{max}$, where $$\alpha_n = \frac{L_n}{N_1 N_2},$$

$$\alpha_{tot} = \frac{L_{tot}}{N_{TRP} N_1 N_2} \text{ (or } \alpha_{tot} = \frac{L_{tot}}{NN_1 N_2}\text{),}$$

and $\alpha_{max} = \frac{L_{max}}{N_{TRP} N_1 N_2}$ (or $\alpha_{max} = \frac{L_{max}}{NN_1 N_2}$).

Figure 19:
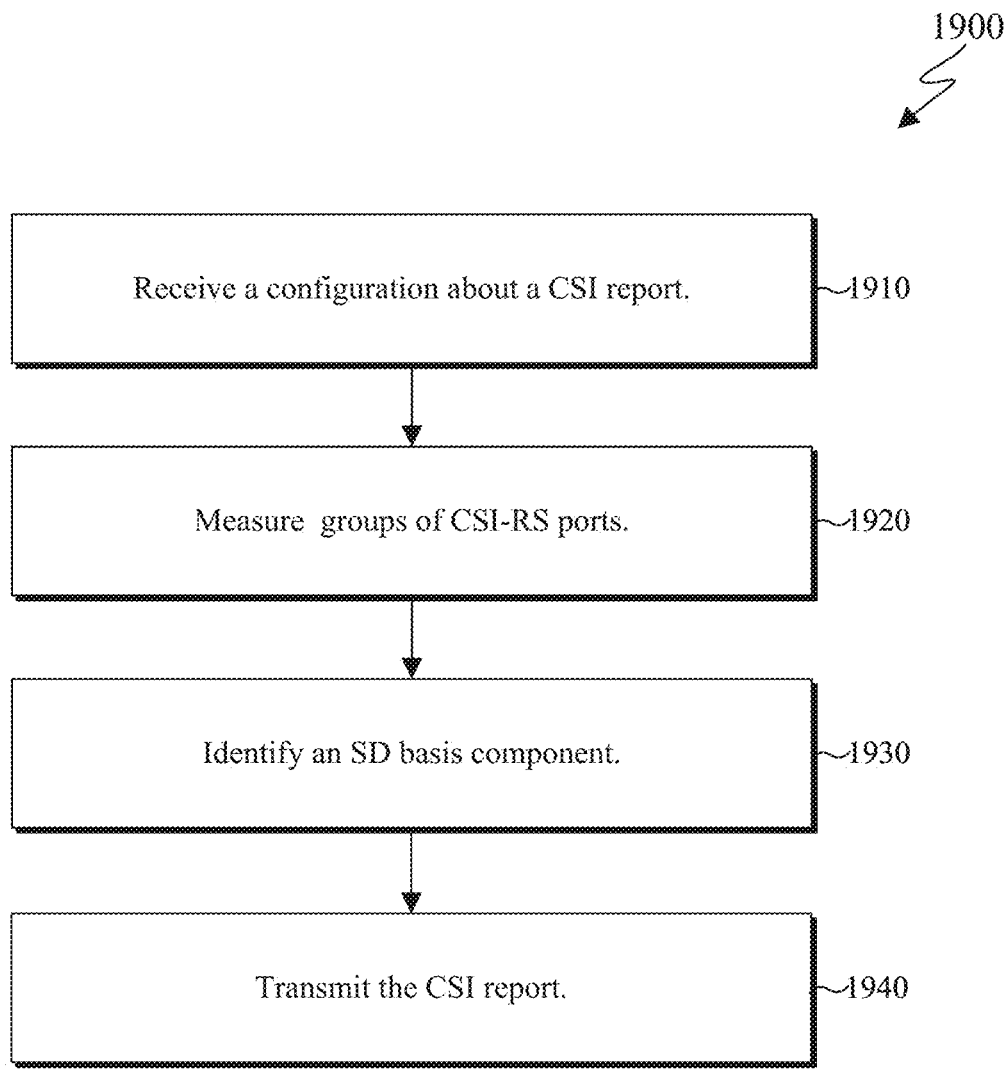
FIG. 19 illustrates an example method for a CSI codebook according to embodiments of the present disclosure.

FIG. 19 illustrates an example method 1900 for a CSI codebook according to embodiments of the present disclosure. The steps of the method 1900 of FIG. 19 can be performed by any of the UEs 111-116 of FIG. 1, such as the UE 116 of FIG. 3 and an analogous, complementary procedure may be performed by a base station such as the BS 102 of FIG. 2. The method 1900 is for illustration only and other embodiments can be used without departing from the scope of the present disclosure.

The method 1900 begins with the UE receiving a configuration about a CSI report (step 1910). For example, in step 1910, the configuration includes information about (i) N>1 groups of CSI-RS ports and (ii) a codebook. The codebook includes a SD basis component. The SD basis component includes $L_r$ basis vectors for each group r=1, ..., N. For example, each of the N groups of CSI-RS ports is associated with a respective NZP CSI-RS resource. In various embodiments, the $L_r$ values for r=1, ..., N are indicated by a joint indicator and the joint indicator is a function of the $L_r$ values. In one example, the joint indicator indicates ($L_1$, ..., $L_N$) selected from a set $\mathcal{L}_{joint}$, where $\mathcal{L}_{joint}$ is a subset of a set including all combinations of ($l_1$, ..., $l_N$) and $l_r$=1, 2, ..., 6 for r=1, ..., N. In another example, the joint indicator indicates ($\alpha_1$, ..., $\alpha_N$) selected from a set $A_{joint}$, where $A_{joint}$ is a subset of a set including all combinations of ($\alpha_1$, ..., $\alpha_N$) where $$\alpha_r = \frac{1}{2}, \frac{3}{4}, 1$$

for r=1, ..., N. In another example, $L_r = \alpha_r P_{CSI-RS}/2$ and $P_{CSI-RS}$ is a number of the CSI-RS ports for each group r=1, ..., N. In another example, the joint indicator indicates $L_{sum} = \Sigma_{r=1}^N L_r$ selected from a set $\mathcal{L}_{sum}$, where $\mathcal{L}_{sum}$ is a subset of a set including 1, 2, ..., 24.

The UE then measures the N groups of CSI-RS ports (step 1920). For example, in step 1920, the measurement is performed based on the received configuration. The UE then identify the SD basis component (step 1930). For example, in step 1930, the SD basis component is identified based on the measurement of the N groups of CSI-RS ports.

The UE then transmits the CSI report (step 1940). For example, in step 1940, the CSI report includes a $$\left\lceil \log_2 \left( \frac{P_{CSI-RS}}{2} \atop L_r \right) \right\rceil$$

bit indicator for each group r=1, ..., N, where $P_{CSI-RS}$ is a number of the CSI-RS ports for each group r=1, ..., N. In another example, the CSI report includes a $$\left\lceil \log_2 \binom{N_1 N_2}{L_r} \right\rceil$$

bit indicator for each group r=1, ..., N, where, for each group r=1, ..., N:$N_1$ is a number of a first subset of the CSI-RS ports and $N_2$ is a number of a second subset of the CSI-RS ports. In another example, the CSI report includes a $$\left\lceil \log_2\left(\frac{P_{CSI-RS,total}}{2 \atop L_{sum}}\right) \right\rceil$$

bit indicator, where $P_{CSI-RS,total}$ is a total number of the CSI-RS ports across all groups r=1, ..., N.

Any of the above embodiments can be utilized independently or in combination with at least one other embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a communication system, the UE comprising:
a transceiver; and
a processor coupled with the transceiver and configured to:
receive, from a base station (BS), a configuration on a channel state information (CSI) report, the configuration including (i) information on N>1 groups of CSI reference signal (CSI-RS) ports and (ii) information on a codebook, wherein:
the codebook includes $L_r$ first basis vectors for each group r=1 ..., N, and
based on the configuration:
measure the N groups of CSI-RS ports, and
identify, based on the measurement, the $L_r$ first basis vectors for each group r=1, ..., N,
obtain CSI associated with the $L_r$ first basis vectors for each group r=1, ..., N, and
transmit, to the BS, the CSI report,
wherein values of $L_r$ values for each group r=1, ..., N are indicated by a joint indicator received via radio resource control (RRC) signaling.

2. The UE of claim 1, wherein each of the N groups of CSI-RS ports is associated with a respective non-zero power (NZP) CSI-RS resource.

3. The UE of claim 1, wherein the joint indicator indicates $(L_1, \ldots, L_N)$ selected from a set $\mathcal{L}_{joint}$, where $\mathcal{L}_{joint}$ is a subset of a set including all combinations of $(l_1, \ldots, l_N)$ and $l_r=1,2, \ldots, 6$ for r=1, ..., N.

4. The UE of claim 1, wherein the CSI report includes a $$\left\lceil \log_2\binom{N_1 N_2}{L_r} \right\rceil$$

bit indicator for each group r=1, ..., N indicating $L_r$ basis vectors,
where, for each group r=1, ..., N:
$N_1$ is a number of a first subset of the CSI-RS ports, and
$N_2$ is a number of a second subset of the CSI-RS ports.

5. The UE of claim 1, wherein the codebook includes $M_v$, second basis vectors common for the N groups of CSI-RS ports.

6. A base station (BS) comprising:
a transceiver; and
a processor coupled with the transceiver and configured to:
generate a configuration about a channel state information (CSI) report, the configuration including (i) information on N>1 groups of CSI reference signal (CSI-RS) ports and (ii) information a codebook, wherein:
the codebook includes $L_r$ first basis vectors for each group r=1, ..., N;
transmit, to a user equipment (UE), the configuration; and
receive, from the UE, the CSI report that is based on the N groups of CSI-RS ports and the $L_r$ first basis vectors for each group r=1, ..., N,
wherein values of $L_r$ for each group r=1, ..., N are indicated by a joint indicator transmitted via radio resource control (RRC) signaling.

7. The BS of claim 6, wherein each of the N groups of CSI-RS ports is associated with a respective non-zero power (NZP) CSI-RS resource.

8. The BS of claim 6, wherein the joint indicator indicates $(L_1, \ldots, L_N)$ selected from a set $\mathcal{L}_{joint}$, where $\mathcal{L}_{joint}$ is a subset of a set including all combinations of $(l_1, \ldots, l_N)$ and $l_r=1,2, \ldots, 6$ for r=1, ..., N.

9. The BS of claim 6, wherein the CSI report includes a $$\left\lceil \log_2\binom{N_1 N_2}{L_r} \right\rceil$$

bit indicator for each group r=1, ..., N indicating $L_r$ basis vectors,
where, for each group r=1, ..., N:
$N_1$ is a number of a first subset of the CSI-RS ports, and
$N_2$ is a number of a second subset of the CSI-RS ports.

10. The BS of claim 6, wherein the codebook includes $M_v$ second basis vectors common for the N groups of CSI-RS ports.

11. A method performed by a user equipment (UE) in a communication system, the method comprising:
receiving, from a base station (BS), a configuration about a channel state information (CSI) report, the configuration including (i) information on N>1 groups of CSI reference signal (CSI-RS) ports and (ii) information on a codebook, wherein:
the codebook includes $L_r$ first basis vectors for each group r=1, ..., N;

based on the configuration:
- measuring the N groups of CSI-RS ports, and
- identifying, based on the measurement, the $L_r$ first basis vectors for each group r=1, ..., N, and
- obtaining CSI associated with the $L_r$ first basis vectors for each group r=1, ..., N; and transmitting, to the BS, the CSI report, wherein values of $L_r$ for each group r=1, ..., N are indicated by a joint indicator received via radio resource control (RRC) signaling.

12. The method of claim 11, wherein each of the N groups of CSI-RS ports is associated with a respective non-zero power (NZP) CSI-RS resource.

13. The method of claim 11, wherein the joint indicator indicates $(L_1, \ldots, L_N)$ selected from a set $\mathcal{L}_{joint}$, Where $\mathcal{L}_{joint}$ is a subset of a set including all combinations of $(l_1, \ldots, l_N)$ and $l_r=1,2,\ldots,6$ for r=1, ..., N.

14. The method of claim 11, wherein the CSI report includes a $$\left\lceil \log_2 \binom{N_1 N_2}{L_r} \right\rceil$$

bit indicator for each group r=1, ..., N indicating $L_r$ basis vectors,
where, for each group r=1, ..., N:
- $N_1$ is a number of a first subset of the CSI-RS ports, and
- $N_2$ is a number of a second subset of the CSI-RS ports.

15. The method of claim 11, wherein the codebook includes My second basis vectors common for the N groups of CSI-RS ports.

* * * * *